United States Patent
Kaneda

(10) Patent No.: US 11,520,547 B2
(45) Date of Patent: Dec. 6, 2022

(54) IMAGE FORMING APPARATUS, CONTROL METHOD OF IMAGE FORMING APPARATUS, AND STORAGE MEDIUM

(71) Applicant: CANON KABUSHIKI KAISHA, Tokyo (JP)

(72) Inventor: Takeshi Kaneda, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/240,464

(22) Filed: Apr. 26, 2021

(65) Prior Publication Data

US 2021/0342107 A1    Nov. 4, 2021

(30) Foreign Application Priority Data

Apr. 30, 2020  (JP) .............................. JP2020-080776

(51) Int. Cl.
  *G06F 3/12*  (2006.01)
(52) U.S. Cl.
  CPC .......... *G06F 3/1257* (2013.01); *G06F 3/1204* (2013.01); *G06F 3/1287* (2013.01)
(58) Field of Classification Search
  None
  See application file for complete search history.

(56) References Cited

U.S. PATENT DOCUMENTS

| | | | |
|---|---|---|---|
| 2012/0120437 A1* | 5/2012 | Nanaumi | G06F 3/1288 358/1.15 |
| 2015/0121556 A1* | 4/2015 | Hashimoto | G06F 21/6218 726/32 |
| 2019/0129669 A1* | 5/2019 | Takahashi | G06F 3/1271 |

FOREIGN PATENT DOCUMENTS

JP         2019-006099 A       1/2019

* cited by examiner

*Primary Examiner* — Frantz Bataille
(74) *Attorney, Agent, or Firm* — Canon U.S.A., Inc. I.P. Division

(57) ABSTRACT

An image forming apparatus includes a storage unit configured to store setting values of a plurality of setting items and identification information in association with each other, a receiving unit configured to receive an acquisition request for the identification information stored in the storage unit, from a predetermined print service, and a transmission unit configured to transmit, based on the received acquisition request, the stored identification information, and information for setting a first setting item unsettable in a predetermined print service associated with the identification information, in the predetermined print service, to the predetermined print service, and not to transmit information for setting a second setting item unsettable in the predetermined print service associated with the identification information, in the predetermined print service, to the predetermined print service.

20 Claims, 16 Drawing Sheets

Add Presets/Finishing-Template | 606 — [Add] [Delete]

601 — Name: [                    ]

602 — Type: ☐ IPP Preset    ☐ Finishing Template

| Select (603) | Item Name (609) | Change Settings (604) | Change by job (605) |
|---|---|---|---|
| ☐ | Number of Copies | [1] (1 – 9999) | ☐ |
| ☐ | 2-Sided Printing | ▼OFF | ☐ |
| ☐ | Staple | ▼OFF | ☐ |
|  | Staple Position | ▼TopLeft | ☐ |
| ☐ | Punch | ▼OFF | ☐ |
|  | Punch Position | ▼Left | ☐ |
| ☐ | Booklet | ▼OFF | ☐ |
|  | Opening Style (607) | ▼Left Opening | ☐ |
|  | Creep Correction (608) | [0.0] 0.0 – 10.0 | ☐ |
| ☐ | Store | ▼OFF | ☐ |
|  | Box Number | [1] 1 – 100 | ☐ |
| ☐ | Toner Save | ▼OFF | ☐ |

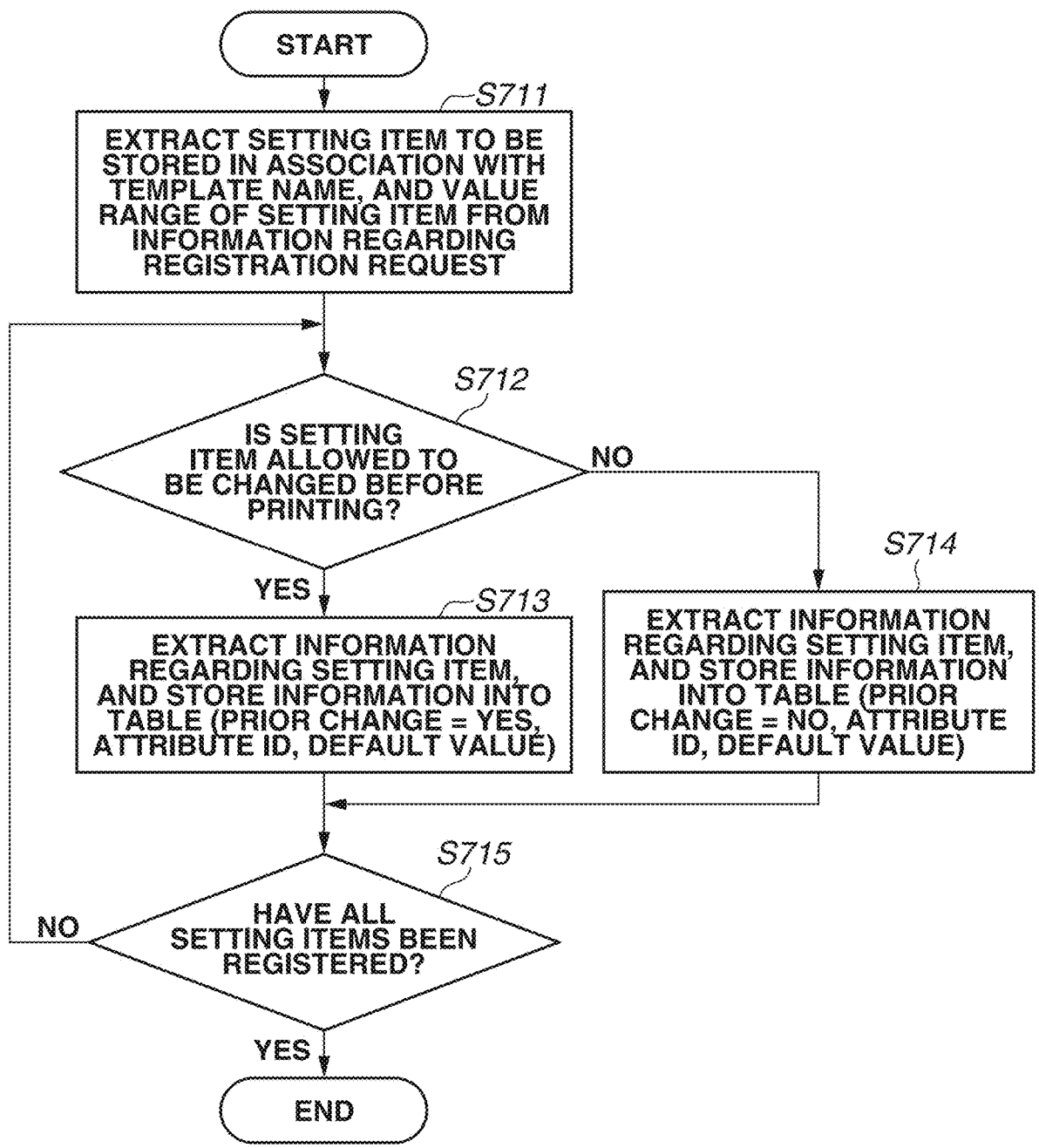

FIG.8A
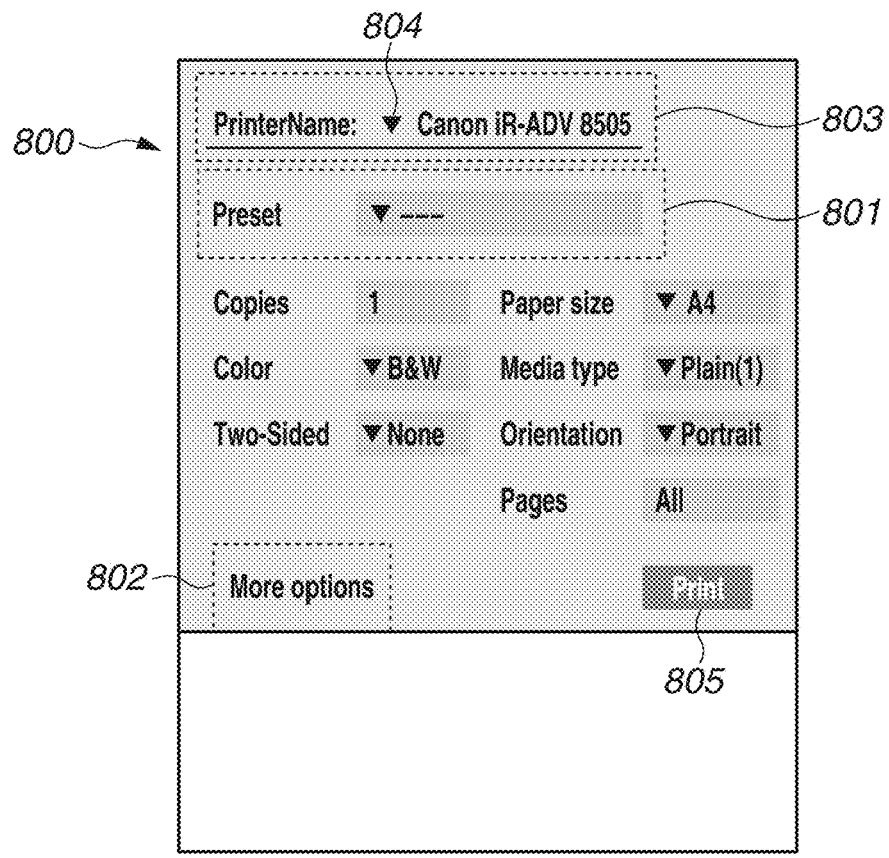
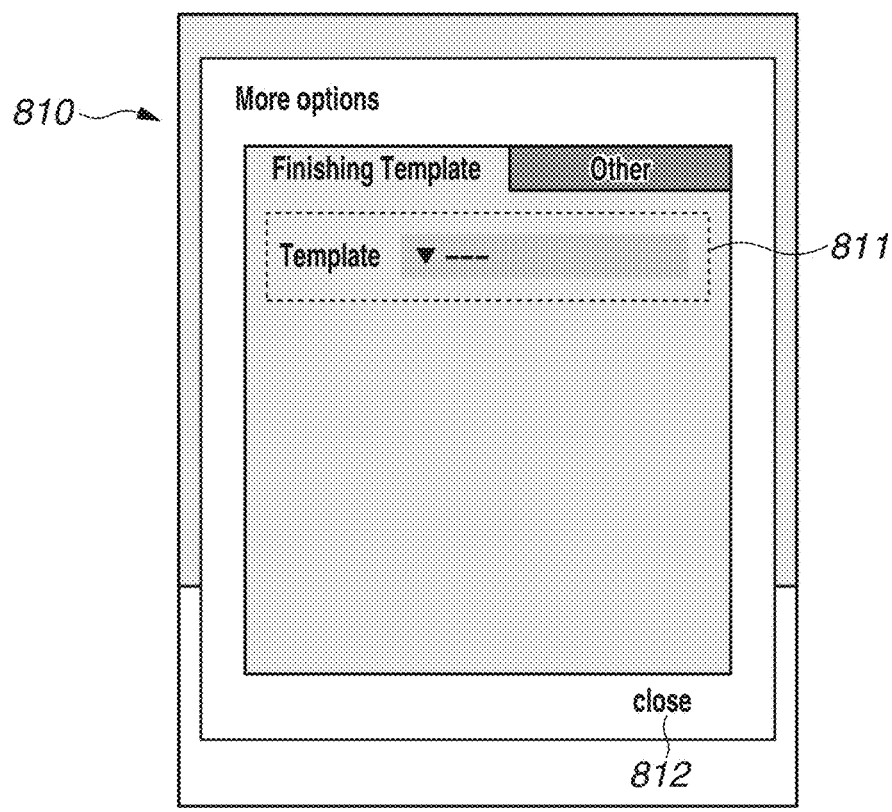

FIG.8B
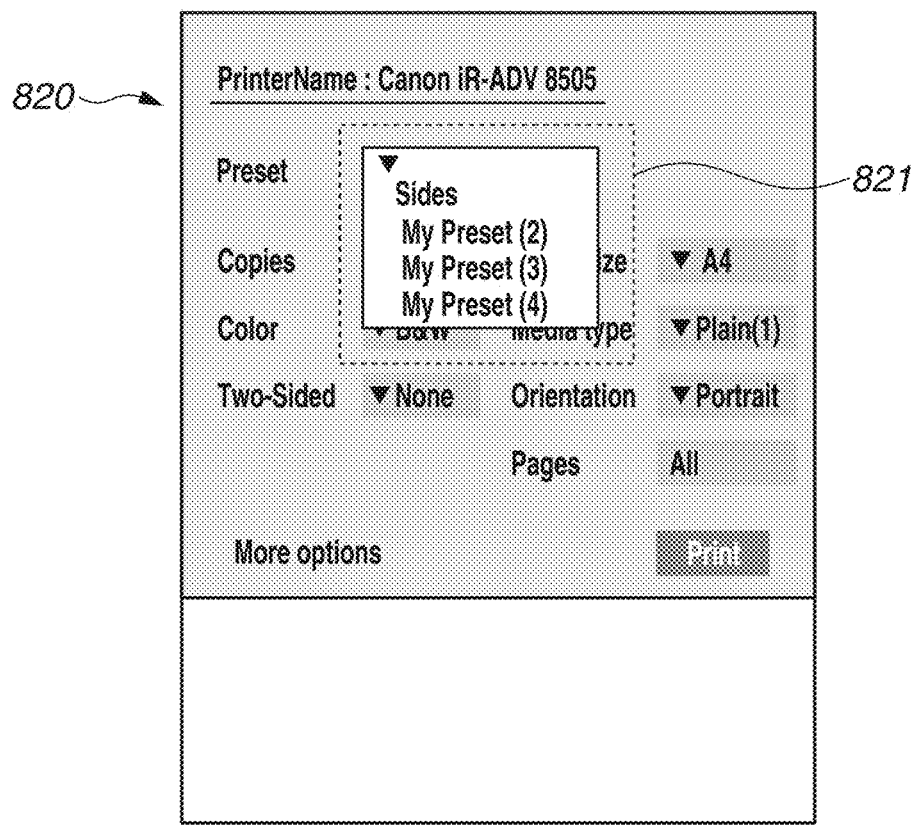
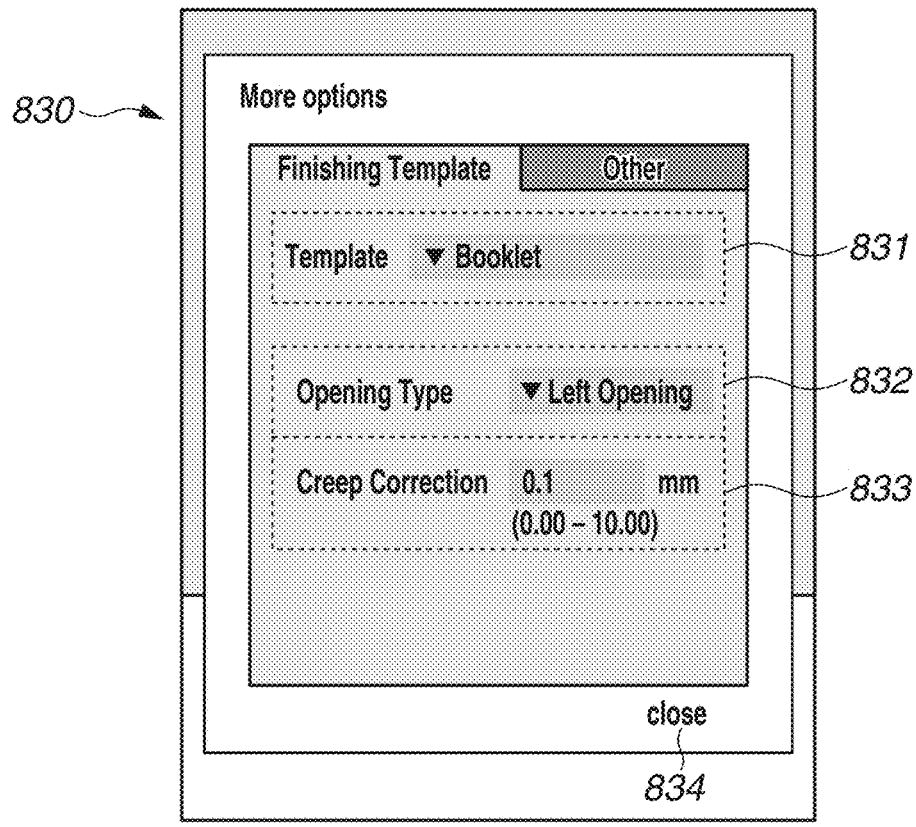

FIG.8C
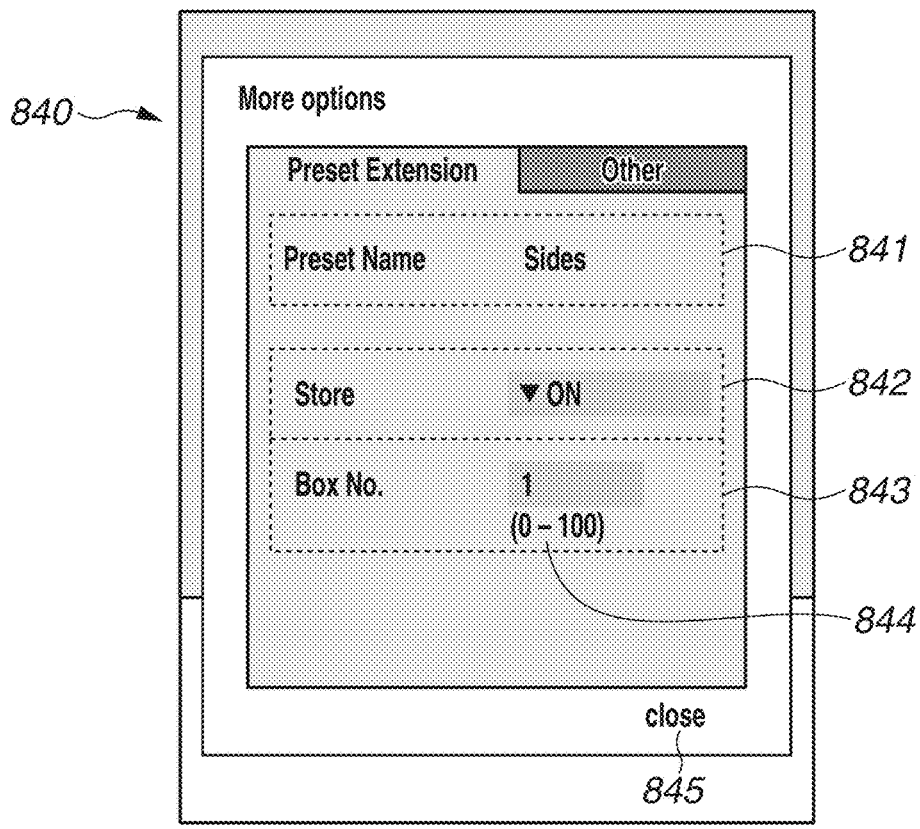
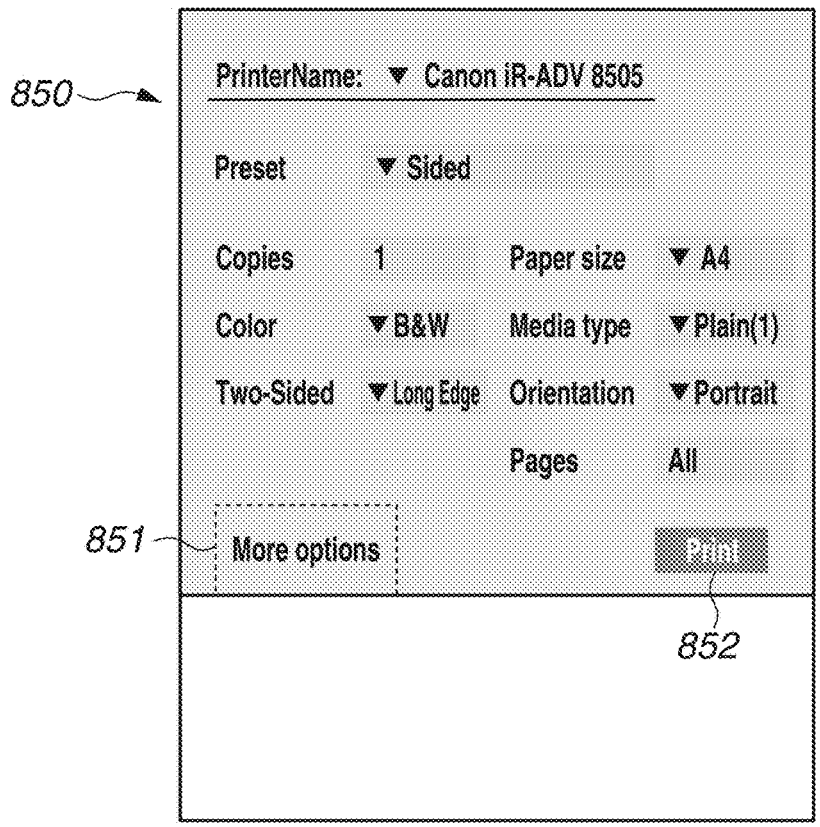

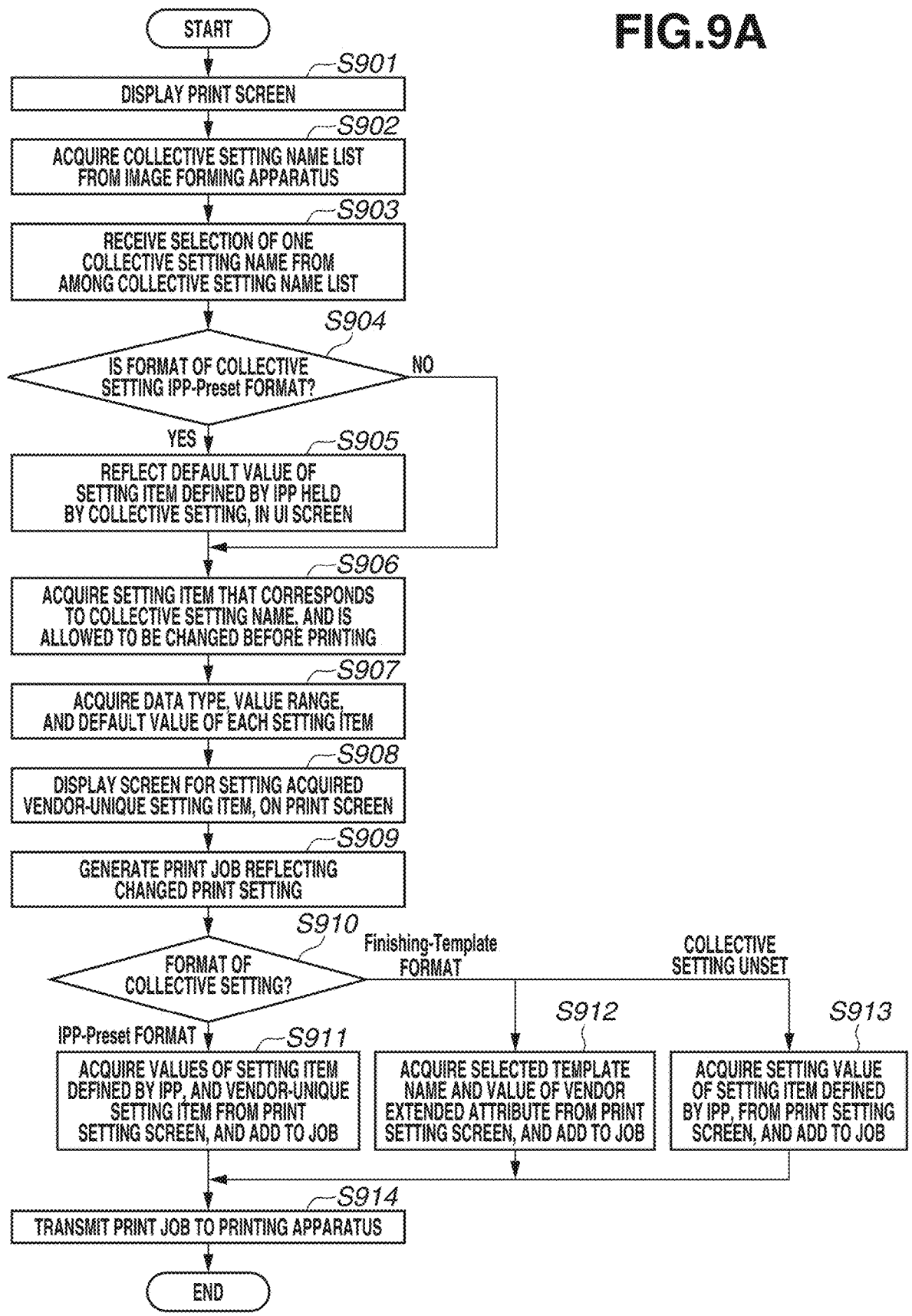

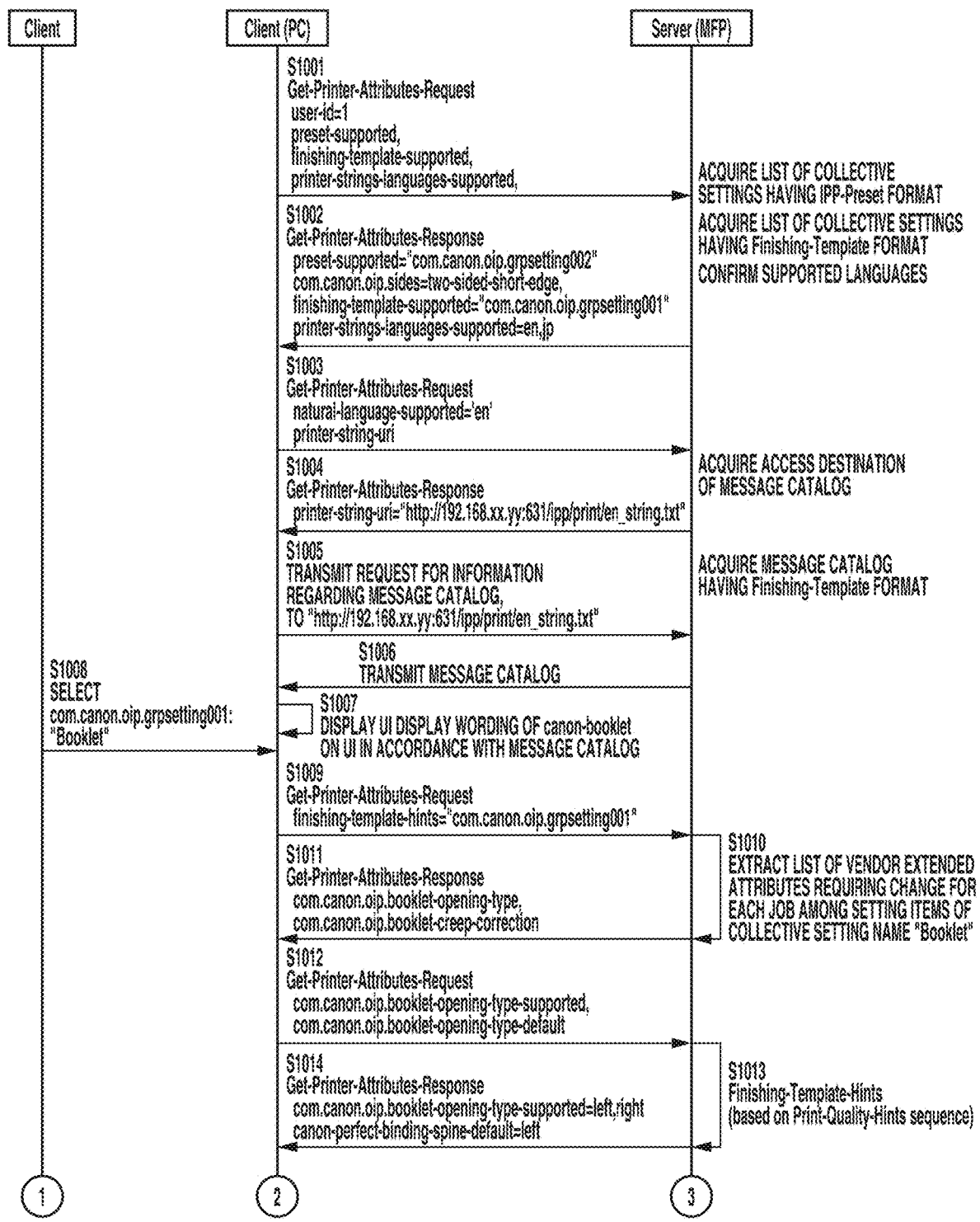

FIG.11A

USER MANAGEMENT TABLE (1110)

| USER ID (1111) | PASSWORD (1112) | USER NAME (1113) |
|---|---|---|
| 1 | pass-kaneda-2020 | kaneda |
| 2 | pass-matsui-2020 | matsui |

COLLECTIVE SETTING MANAGEMENT TABLE (1120)

| REGISTRANT ID (1121) | COLLECTIVE SETTING ID (1122) | TYPE (1124) | COLLECTIVE SETTING NAME (1123) | COLLECTIVE SETTING KEY (1125) |
|---|---|---|---|---|
| 1 | 1 | fin-template | Booklet | com.canon.oip.grpsetting001 |
| 1 | 2 | preset | Sides | com.canon.oip.grpsetting002 |
| 2 | 3 | fin-template | Sides | com.canon.oip.grpsetting003 |

COLLECTIVE ATTRIBUTE MASTER TABLE (1130)

| ATTRIBUTE ID (1131) | ATTRIBUTE KEY (1132) | EXTENDED ATTRIBUTE (1133) | DATA TYPE (1134) | VALUE RANGE (1135) |
|---|---|---|---|---|
| 50 | com.canon.oip.booklet | YES | Boolean | true, false |
| 51 | com.canon.oip.booklet-opening-type | YES | Type3 Keyword | left, right |
| 52 | com.canon.oip.booklet-creep-correction | YES | Integer | 0:10 |
| 20 | com.canon.oip.sides | NO | Type2 Keyword | one-sided, two-sided-long-edge, two-sided-shortedge |
| 53 | com.canon.oip.tonorsave | YES | Boolean | true, false |
| 54 | com.canon.oip.box | YES | Boolean | true, false |
| 55 | com.canon.oip.boxno | YES | Integer | 0:100 |

FIG.11B

COLLECTIVE ATTRIBUTE MANAGEMENT TABLE (1140)

| COLLECTIVE SETTING ID (1141) | ATTRIBUTE KEY (1142) | PRIOR CHANGE (1143) | DEFAULT VALUE (1144) |
|---|---|---|---|
| 1 | 50 | NO | TRUE |
| 1 | 51 | YES | left |
| 1 | 52 | YES | 2 |
| 1 | 20 | YES | two-sided-long-edge |
| 2 | 20 | YES | two-sided-short-edge |
| 2 | 53 | NO | TRUE |
| 2 | 54 | NO | TRUE |
| 2 | 55 | YES | 1 |
| 3 | 20 | NO | two-sided-long-edge |

MESSAGE CATALOG TABLE (1150)

| KEY | EN |
|---|---|
| com.canon.oip.booklet | booklet |
| com.canon.oip.booklet-opening-type | opening type |
| com.canon.oip.booklet-creep-correction | creep correction |
| com.canon.oip.sides | sides |
| com.canon.oip.tonorsave | tonorsave |
| com.canon.oip.box | Store |
| com.canon.oip.boxno | Box NO. |
| left | Left |
| right | Right |
| true | ON |
| false | OFF |
| com.canon.oip.grpsetting001 | Booklet |
| com.canon.oip.grpsetting002 | Sides |
| com.canon.oip.grpsetting003 | Sides |

IMAGE FORMING APPARATUS, CONTROL METHOD OF IMAGE FORMING APPARATUS, AND STORAGE MEDIUM

BACKGROUND

Field of the Disclosure

The present disclosure relates to an image forming apparatus, a control method of an image forming apparatus, and a storage medium.

Description of the Related Art

In recent years, a plurality of operating systems (OSs) included in an information processing apparatus includes an internet printing protocol (IPP) as a standard print function included in an OS. In the IPP, the information processing apparatus can select various print settings suitable for capability information notified from an image forming apparatus, on a print screen of the information processing apparatus. The present disclosure relates to the capability notification and a selection method of print settings.

As one conceivable method, there is a method of registering setting values of a plurality of setting items into an image forming apparatus as a collective setting of one set, and performing a print setting in an information processing apparatus using the set of setting values registered in the image forming apparatus. Japanese Patent Application Laid-Open No. 2019-006099 discusses that a user preliminarily registers a plurality of setting items into an image forming apparatus as a set. An information processing apparatus acquires information for identifying a set of setting values registered in the image forming apparatus, from the image forming apparatus, and displays the acquired information on a display unit of the information processing apparatus. The information processing apparatus displays the acquired identification information, and receives the selection of identification information to be used for printing, from the user. Then, the information processing apparatus transmits the selected identification information to the image forming apparatus.

On a print setting screen provided by a print service supporting the IPP, user-settable setting items are restricted to setting items defined by the IPP, and setting items and setting values that are unique to a vendor of an image forming apparatus cannot be set. Examples of the vendor-unique setting items and setting values include setting items and setting values related to an "opening direction" and a "creep correction amount" that are to be set when bookbinding processing is performed.

Among vendor-unique setting items included in a set of a plurality of setting items registered in an image forming apparatus, some items are desired to be changed in setting before printing while the other items need not to be changed in setting before printing. For example, the above-described creep correction amount is sometimes changed appropriately before printing in accordance with the number of copies to be printed. On the other hand, a toner save setting for saving a toner amount to be used is always enabled for executing a job if the collective setting is used, and is an item unlikely to be changed in setting before printing. If a screen for changing setting items unlikely to be changed in setting is displayed, information highly likely to be unnecessary for the user is displayed.

SUMMARY

According to embodiments of the present disclosure, an image forming apparatus includes a storage unit configured to store setting values of a plurality of setting items and identification information in association with each other, a receiving unit configured to receive an acquisition request for the identification information stored in the storage unit, from a predetermined print service, and a transmission unit configured to transmit, based on the received acquisition request, the stored identification information, and information for setting a first setting item unsettable in a predetermined print service associated with the identification information, in the predetermined print service, to the predetermined print service, and not to transmit information for setting a second setting item unsettable in the predetermined print service associated with the identification information, in the predetermined print service, to the predetermined print service.

Further features of the present disclosure will become apparent from the following description of exemplary embodiments with reference to the attached drawings.

BRIEF DESCRIPTION OF THE DRAWINGS

FIG. 6 illustrates an example of a preset/template registration screen according to the present exemplary embodiment.

FIG. 7 is a flowchart illustrating setting processing of a preset/template according to the present exemplary embodiment.

FIGS. 8A to 8C are a diagram illustrating an example of a print setting screen to be displayed on a touch panel of the information processing apparatus according to the present exemplary embodiment.

FIGS. 9A and 9B are flowcharts illustrating acquisition processing of a vendor extended attribute according to the present exemplary embodiment.

FIGS. 10A and 10B are a sequence diagram illustrating processing of acquiring and setting an extended attribute associated with a template/preset according to the present exemplary embodiment.

FIGS. 11A and 11B are diagrams illustrating examples of data structures of tables stored in a preset/template database (DB) according to the present exemplary embodiment.

DESCRIPTION OF THE EMBODIMENTS

In the present exemplary embodiment, a user registers a preset or a template into an image forming apparatus using setting values of a plurality of setting items as one set. An information processing apparatus acquires identification information of a collective setting being a set of setting values of a plurality of setting items, from the image forming apparatus, and displays the acquired identification information on a print setting screen. The user acquires identification information of a collective setting to be used in a print setting, from the print setting screen of the information processing apparatus. In the present exemplary embodiment, vendor-unique setting items and setting values can be set as a collective setting in addition to setting items and setting values that are defined by an internet printing protocol (IPP).

The image forming apparatus identifies a setting item required to be changed in setting before job execution, among setting items included in one collective setting.

Then, among setting items included in a collective setting, vendor-unique setting items and setting values that might be changed in setting before job execution are notified to the image forming apparatus with being associated with identification information of the collective setting. With this configuration, when a collective setting to be used for printing in the image forming apparatus is selected by the user, even if the selected collective setting includes a vendor-unique setting item, the information processing apparatus can change a print setting of the setting item before job execution.

Figure 1:
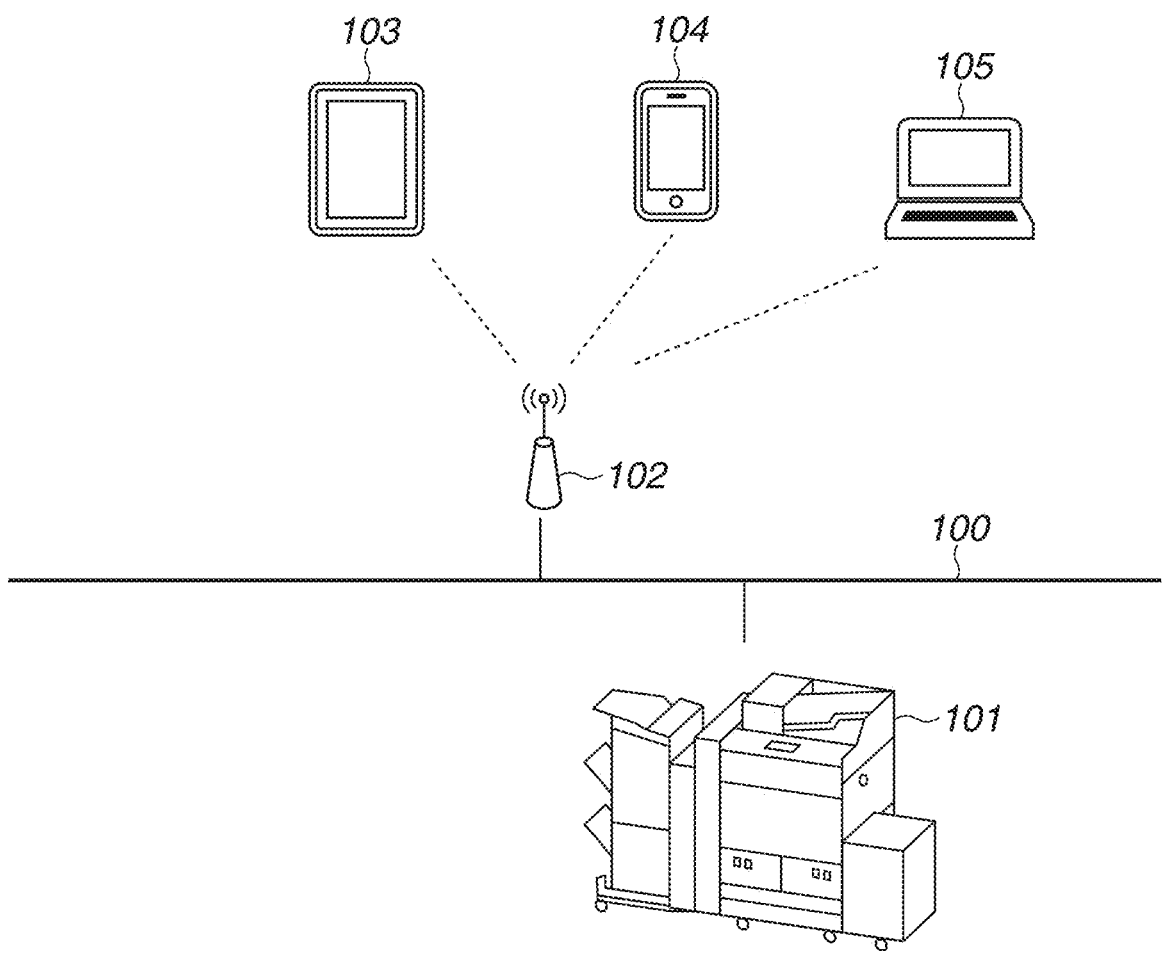
FIG. 1 is a diagram illustrating an example of a system configuration according to the present exemplary embodiment.

The description will be given with reference to FIG. 1. FIG. 1 is a diagram illustrating an example of a configuration of a printing system according to an exemplary embodiment of the present disclosure. An image forming apparatus 101 is connected to a local area network (LAN) 100. Information processing apparatuses 103, 104, and 105 are connected to the LAN 100 via an access point (AP) 102. In the present exemplary embodiment, the description will be given using the information processing apparatuses 103, 104, and 105 such as a tablet, a smartphone, and a personal computer (PC) as examples of an information processing apparatus. In the following description, a tablet, a smartphone, and a PC will be collectively referred to as information processing apparatuses. These information processing apparatuses can transmit print data to the image forming apparatus 101 via the LAN 100. In the present exemplary embodiment, the description will be given using the above-described configuration example as an example of a printing system, but the present disclosure is not limited to this. It is only required that at least one or more information processing apparatuses and an image forming apparatus are connected via a network in such a manner that communication can be performed. In addition, the network may be a wireless network or may be a wired network.

Figure 2:
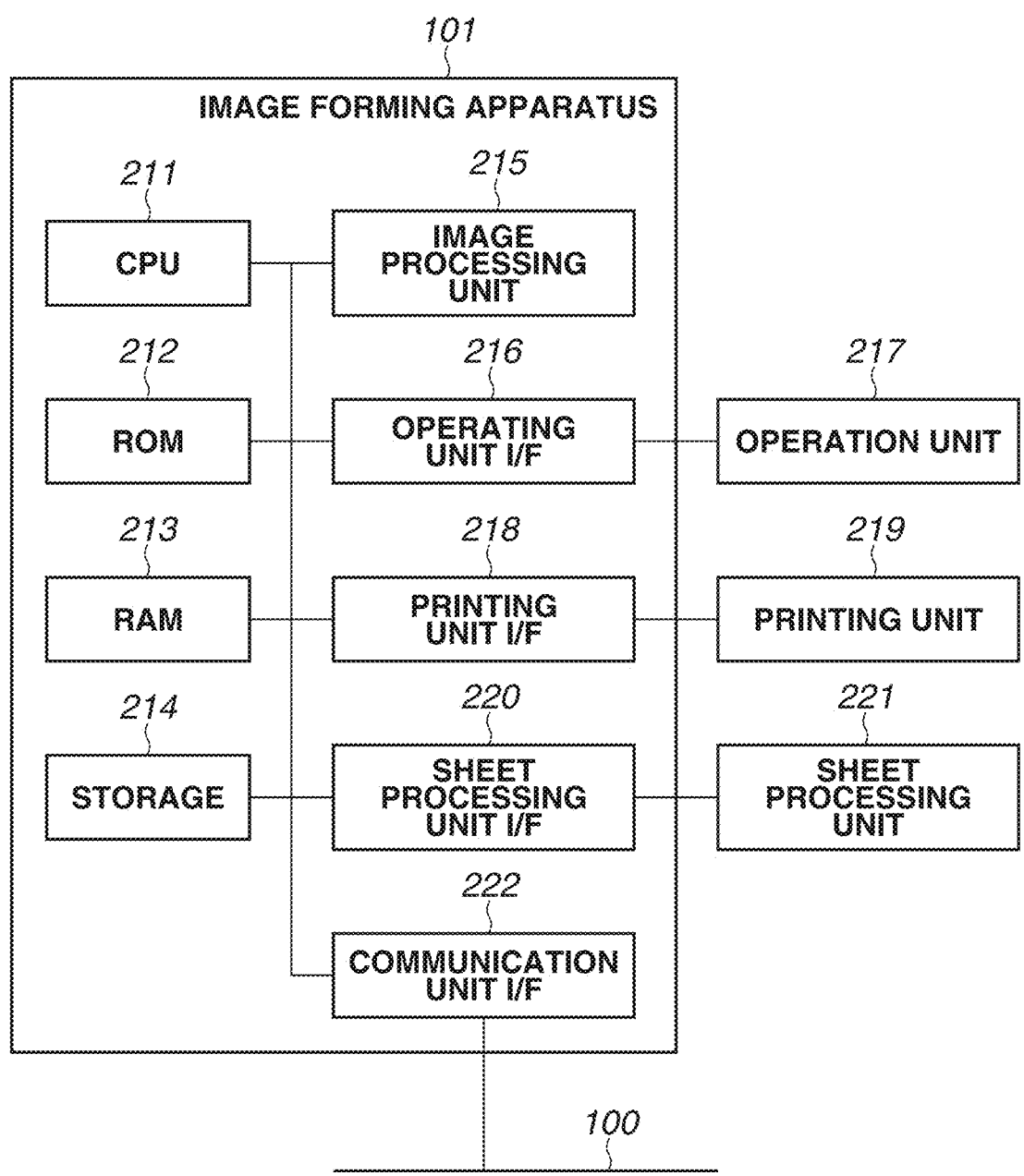
FIG. 2 is a diagram illustrating an example of a hardware configuration of an image forming apparatus according to the present exemplary embodiment.

FIG. 2 is a diagram illustrating an example of a hardware configuration of the image forming apparatus 101.

FIG. 2 is a block diagram illustrating a hardware configuration of the image forming apparatus 101 according to the present exemplary embodiment. In the present exemplary embodiment, the description will be given using an image forming apparatus as an example, but an image forming apparatus such as a multifunction peripheral (MFP) including a scanner function and a fax function may be used as an image forming apparatus. A central processing unit (CPU) 211 operates as a control unit that controls the operations of the entire image forming apparatus 101. The CPU 211 performs various types of control such as printing control and reading control by loading a program stored in a read only memory (ROM) 212 or a storage 214, onto a random access memory (RAM) 213, and executing the program. The ROM 212 stores control programs and boot programs executable by the CPU 211. The RAM 213 is a main storage memory of the CPU 211, and is used as a work area or a temporary storage region for loading various control programs. The storage 214 stores print data, image data, various programs, and various types of setting information. In the present exemplary embodiment, an auxiliary storage device such as a hard disk drive (HDD) is assumed to be used as the storage 214, but a nonvolatile memory such as a solid state drive (SSD) may be used.

In the image forming apparatus 101 according to the present exemplary embodiment, one CPU 211 executes processing illustrated in a flowchart to be described below, using one RAM 213, but another configuration may be employed. For example, a plurality of CPUs, RAMs, ROMs, and storages may cooperatively execute processing illustrated in a flowchart to be described below. In addition, a part of the processing may be executed using a hardware circuit such as an application specific integrated circuit (ASIC) or a field-programmable gate array (FPGA).

An operation unit interface (I/F) 216 connects an operation unit 217 and the control unit. The operation unit 217 includes a display unit having a touch panel function, and various hardware keys. The operation unit 217 functions as a display unit that displays information, and a reception unit that receives an instruction from the user. A printing unit I/F 218 connects a printing unit 219 and the control unit. Image data generated by analyzing a print job received from an information processing apparatus is transferred from the control unit to the printing unit 219 via the printing unit I/F 218. The printing unit 219 receives, via the control unit, a control command and a print job to be printed, and prints an image onto a sheet fed from a sheet feeding cassette (not illustrated), based on the received print job. A printing method of the printing unit 219 may be an electrophotographic method or may be an inkjet method. In addition, other printing methods such as a thermal transfer method can also be applied. In addition, the control unit is connected to the LAN 100 via a communication unit I/F 222. The communication unit I/F 222 transmits information to the information processing apparatuses 103, 104, and 105, and receives print jobs and information from the information processing apparatuses 103, 104, and 105 on the LAN 100.

An image processing unit 215 has a raster image processor (RIP) function of generating print image data by rasterizing print jobs received from the information processing apparatuses 103, 104, and 105. In addition, the image processing unit 215 can also perform resolution conversion and correction processing of image data obtained by rasterizing print jobs. In the present exemplary embodiment, the image processing unit 215 is implemented by a hardware circuit such as an ASIC or an FPGA, but the image processing unit 215 is not limited to this. For example, the image forming apparatus 101 may further include a processor intended for image processing, and the processor may execute image processing and rasterization processing into print data by executing image processing programs. In this case, the processor and the CPU 211 cooperatively execute processing illustrated in a flowchart to be described below. Furthermore, the CPU 211 may be configured to execute a program for performing image processing, and perform image processing and rasterization processing into print data. In addition, image processing may be performed using any of these combinations.

A sheet processing unit I/F 220 connects the control unit and a sheet processing unit 221. The sheet processing unit 221 receives a control command from the control unit, and performs postprocessing on a sheet printed by the printing unit 219, in accordance with the control command.

Figure 4:
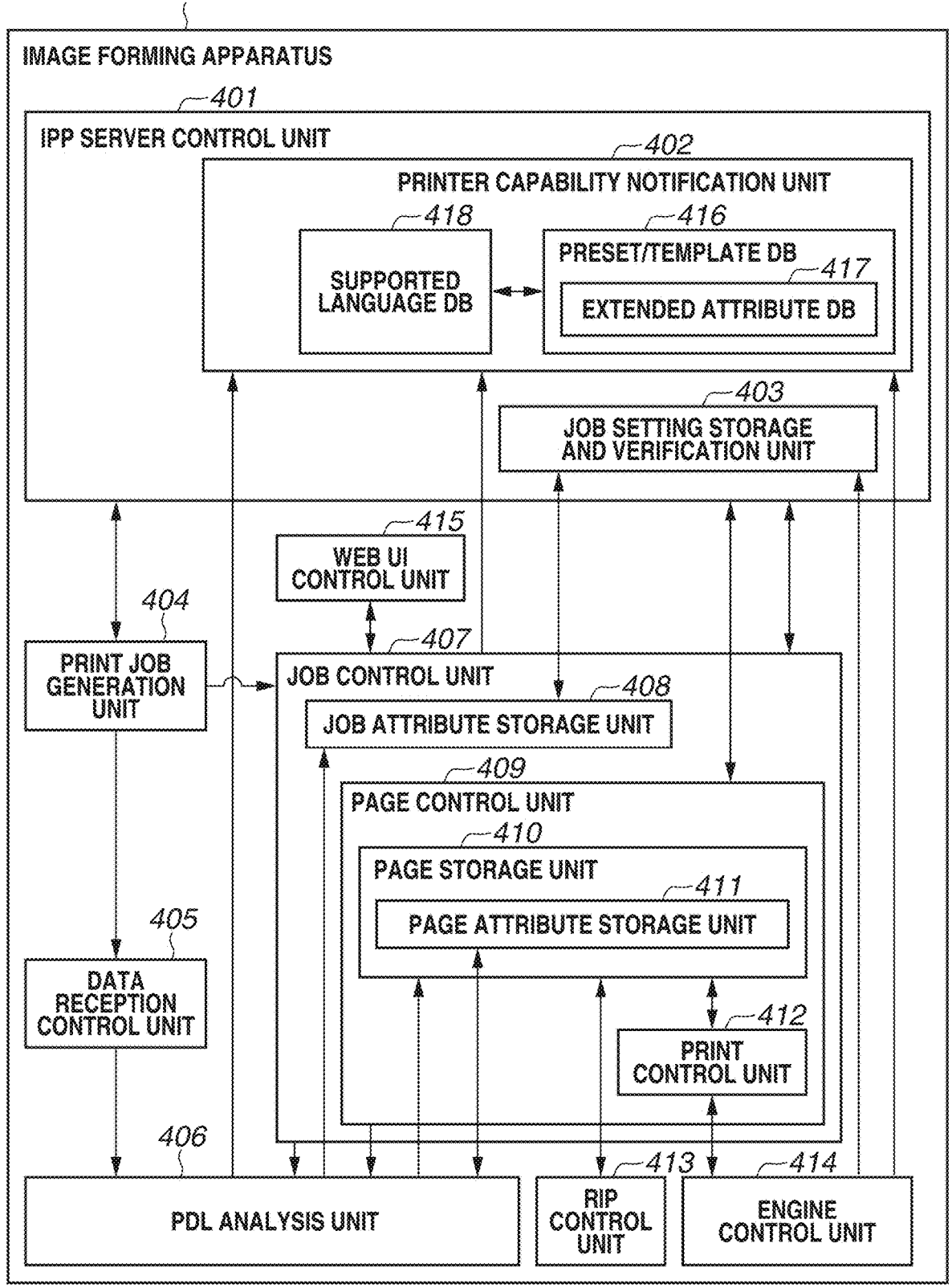
FIG. 4 is a diagram illustrating an example of a software configuration of the image forming apparatus according to the present exemplary embodiment.

FIG. 4 is a diagram illustrating an example of a software configuration of the image forming apparatus 101.

Each functional block illustrated in FIG. 4 is implemented by the CPU 211 executing a program loaded on the RAM 213.

A Web user interface (UI) control unit 415 has a function of registering, as a set, a plurality of print settings to be described below with reference to FIG. 6, and registering and editing a collective setting to be collectively applied. Via a registration screen 600 to be described below, the user registers a plurality of preliminarily-selected and set print settings as one collective setting. A collective setting created by the user via a Web UI is stored into a preset/template database (DB) 416 as a preset or a template. The preset/template DB 416 includes an extended attribute DB 417 storing a data type, a value range, and a default value as detailed information regarding a vendor-unique extended attribute normally undefined by the IPP.

In the present exemplary embodiment, presets and templates can include vendor-unique setting items in addition to setting items normally defined by the IPP. For example, "Number of Copies" and "2-Sided Printing" are attributes defined by the IPP. On the other hand, "Booklet", "Store", and "Toner Save" are vendor-unique setting items. The "Booklet" is an item for setting whether to perform bookbinding printing. If the "Booklet" is set to ON, an opening direction of an output product and a correction amount of a creep amount can be set. The "Store" is a setting item for instructing the image forming apparatus 101 to store print data received by the image forming apparatus 101. If the "Store" is set to ON, the user can set whether to store print data into any box of boxes serving as storage folders included in the image forming apparatus 101. The "Toner Save" is an item for setting whether to perform printing with a suppressed consumed amount of toner at the time of printing. The "Toner Save" can be switched between ON and OFF. In addition, among setting items defined by the IPP, some setting items such as "Staple" and "Punch" are desired to include vendor-unique setting values, or desired to include setting values unsettable in a predetermined print service provided by an operating system (OS). In the present exemplary embodiment, the above-described setting items including setting values unsettable in a predetermined print service are treated as vendor-unique setting items. For example, if the "Staple" for stapling output products is set to ON, positions on a sheet that are to be stapled can be set in addition to the number of stapled points. If the "Punch" for punching a sheet is set to ON, the number of points to be punched, or positions on a sheet that are to be punched can be set.

If the user includes vendor-unique setting items in a collective setting, these setting items related to vendor extension are notified to an information processing apparatus as capability information of an image forming apparatus in association with the name of the collective setting.

An IPP server control unit 401 includes a printer capability notification unit 402. The printer capability notification unit 402 receives an inquiry about the image forming apparatus 101 from the information processing apparatus 103, 104, or 105, and notifies capability information of a printer. Specific examples of capability information to be notified include a name list of collective settings of printing items that is held by the preset/template DB 416, and detailed information regarding a vendor extended attribute included in a collective setting, such as a data type, a value range, and a default value. As names of these collective settings and names of vendor extended attributes, a supported language DB 418 provides character strings for UI display in a Message-Catalog format.

After the information processing apparatus 103, 104, or 105 acquires the capability information of the printer, the information processing apparatus 103, 104, or 105 generates a print job adapted to the printer, and transmits the generated print job to the image forming apparatus 101. The IPP server control unit 401 performs receiving processing of print data from the information processing apparatus 103, 104, or 105.

If the image forming apparatus 101 receives an IPP print job from the information processing apparatus 103, 104, or 105, a job control unit 407 generates a new job via a print job generation unit 404. Subsequently, a job setting storage and verification unit 403 verifies a job attribute designated by an IPP attribute, and writes the job attribute into a job attribute storage unit 408. If a collective setting of print attributes having a Finishing-Template format is to be added to a job, the image forming apparatus 101 inquires of the preset/template DB 416 about an attribute to be applied, and reflects the attribute in a print setting. If an individual print attribute is set in addition to a collective setting, the collective setting is overwritten. The details of attributes that can be collectively set will be described with reference to FIG. 6.

Concurrently with attribute processing, the IPP server control unit 401 transfers drawing data of job data to a data reception control unit 405 and temporarily stores the drawing data into the data reception control unit 405. The data reception control unit 405 serves as a buffer region of a print job received by the print job generation unit 404, and stores each print job into the storage 214.

A page-description language (PDL) analysis unit 406 included in the image forming apparatus 101 according to the present exemplary embodiment supports a portable document format (PDF) and a printer working group (PWG)-raster format. Upon receiving an instruction from the job control unit 407, the PDL analysis unit 406 transmits a request for print drawing data to the data reception control unit 405, and performs analysis processing. A page control unit 409 stores image data of page data generated by the PDL analysis unit 406, into a page storage unit 410, and stores page attribute information into a page attribute storage unit 411.

The page control unit 409 controls page analysis processing performed by the PDL analysis unit 406, RIP processing performed by a RIP control unit 413, and print control processing performed by a print control unit 412. The print control unit 412 acquires RIP-processed image data from the page storage unit 410, separates colors of the image data into RGB, and transfers the image data to an engine control unit 414. The engine control unit 414 receives image data in each color of RGB from the print control unit 412 for each page, and controls the print control unit 412 to perform print processing of each page. The Web UI control unit 415 acquires information regarding a state of a print job being processed, from the job control unit 407, and displays a processing status of the print job on a UI screen.

Figure 3:
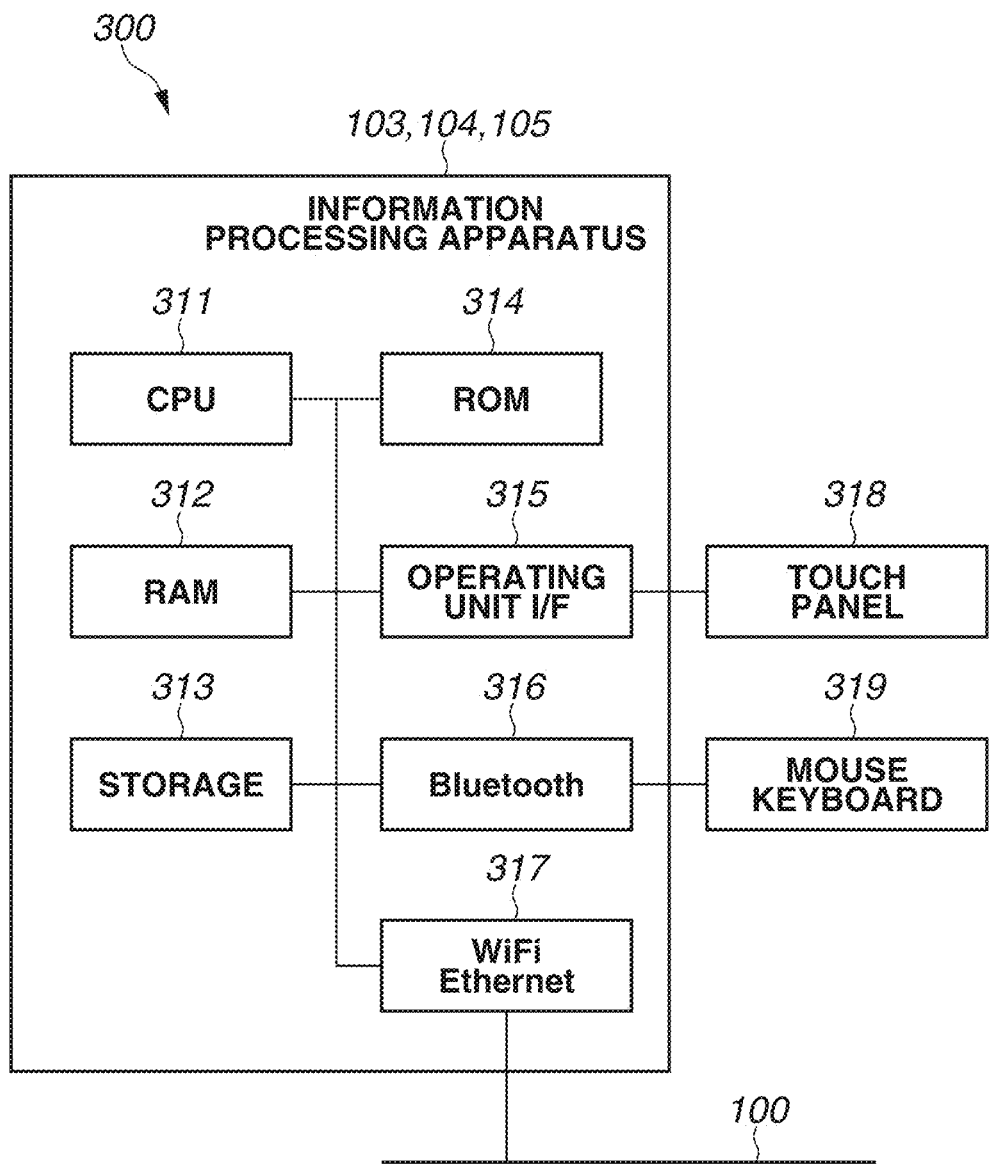
FIG. 3 is a diagram illustrating an example of a hardware configuration of an information processing apparatus according to the present exemplary embodiment.

FIG. 3 is a diagram illustrating an example of a hardware configuration of the information processing apparatuses 103, 104, and 105.

A control unit 300 including a CPU 311 controls the operations of the entire information processing apparatus 103, 104, or 105. The CPU 311 performs various types of control such as the control of a print setting screen, the generation of print data, and the transfer of a print job, by loading a program stored in a ROM 314 or a storage 313 onto a RAM 312, and executing the program. The ROM 314 stores control programs and boot programs executable by the CPU 311. The RAM 312 is a main storage memory of the CPU 311, and is used as a work area or a temporary storage region for loading various programs. The storage 313 stores an OS, a print application, an OS print framework, a print job generated by the OS print framework, and various types of setting information. In the present exemplary embodiment, an auxiliary storage device such as an HDD is assumed to be used as the storage 313, but a nonvolatile memory such as an SSD may be used. A touch panel 318 is connected to an operation unit I/F 315, and notifies not only screen drawing performed on each application or a print setting screen, but also a touch operation of the user to an application operating on the CPU 311.

Figure 5:
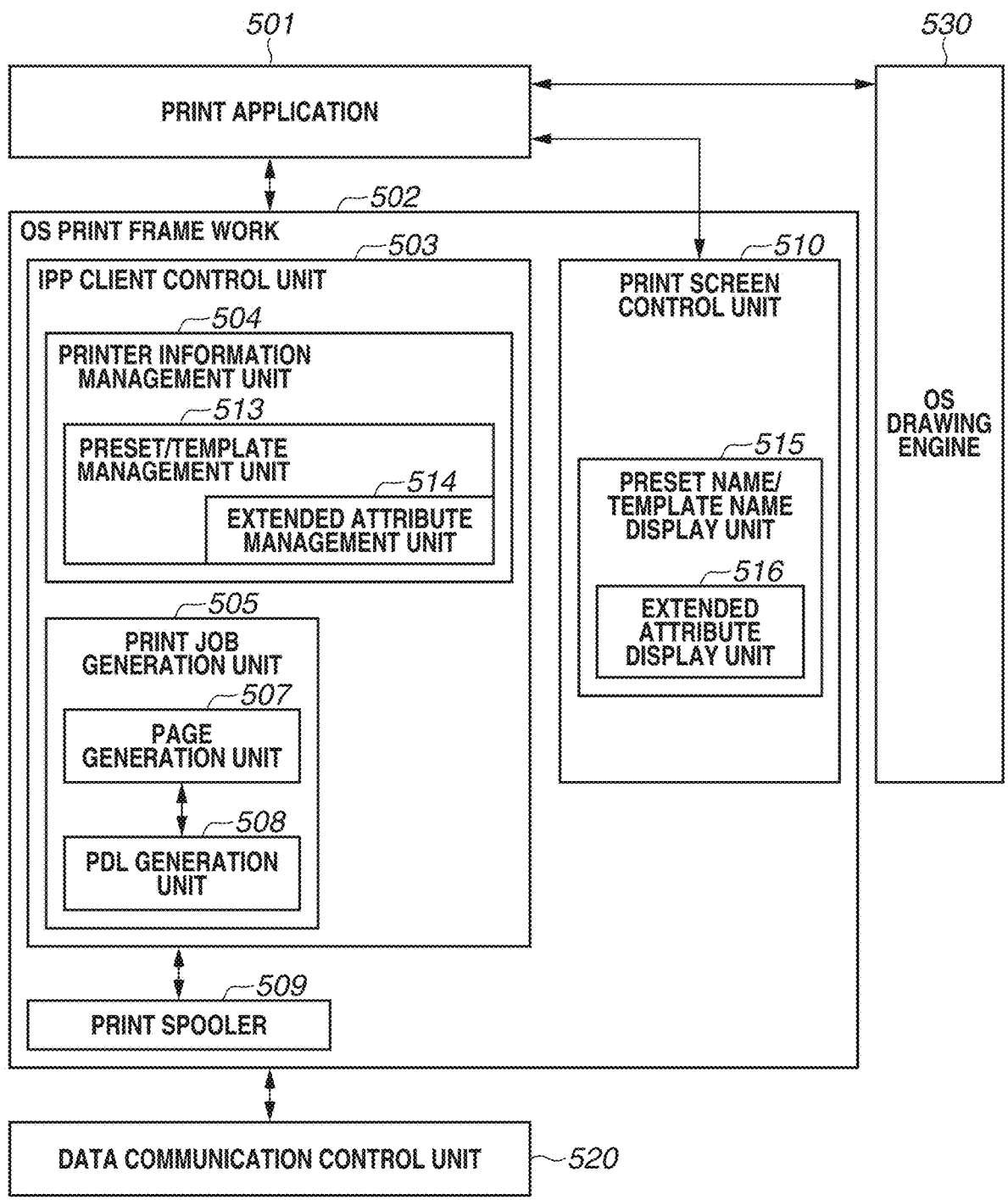
FIG. 5 is a diagram illustrating an example of a software configuration of the information processing apparatus according to the present exemplary embodiment.

FIG. 5 is a diagram illustrating an example of a software configuration of the information processing apparatuses 103, 104, and 105. In the present exemplary embodiment, an OS provides a predetermined print service that is compliant with the IPP.

Each functional block is implemented by the CPU 311 executing a program loaded on the RAM 312. A print application 501 is an arbitrary application to be installed on the information processing apparatus 103, 104, or 105 by the user, and is a general-purpose application such as a word processor, a spreadsheet, a database, an e-mail application, and a web browser. An OS print framework 502 includes an IPP client control unit 503, a print spooler 509, and a print screen control unit 510. The IPP client control unit 503 includes a printer information management unit 504 and a print job generation unit 505. The printer information management unit 504 makes an inquiry to the image forming apparatus 101 via a data communication control unit 520, and acquires and holds capability information of the image forming apparatus 101.

The printer information management unit 504 acquires, as capability information of the image forming apparatus 101, a name list of collective settings such as presets or templates, and detailed information regarding vendor-unique print settings included in the collective settings, such as a data type, a value range, and a default value.

A preset/template management unit 513 in the printer information management unit 504 holds a name list of collective settings. If a collective setting including vendor-unique setting items and setting values is selected by the user, an extended attribute management unit 514 acquires, from the image forming apparatus 101, information regarding attribute names, data types, and value ranges of the vendor-unique setting items and setting values. The extended attribute management unit 514 stores the acquired vendor-unique setting items and setting values into the extended attribute management unit 514.

The print screen control unit 510 displays a print screen in accordance with the calling of the print application 501. The print screen control unit 510 includes a preset name/ template name display unit 515, and displays names of collective settings held by the preset/template management unit 513. A collective setting having an IPP—Preset format is a format in which the name of a collective setting and set setting items and setting values are notified to an information processing apparatus in response to an inquiry about capability information from the information processing apparatus. A collective setting having a Finishing-Template format is a format in which the name of a collective setting is notified and set setting items and setting values are not notified.

If a collective setting including set vendor-unique setting items and setting values is selected by the user, the extended attribute management unit 514 makes an inquiry about information necessary for displaying a screen for setting the vendor-unique setting items included in the selected collective setting, in the information processing apparatus 103, 104, or 105, to the image forming apparatus 101. If a collective setting includes vendor-unique setting items and setting values, information regarding data types, value ranges, and default values that is stored in the extended attribute DB 417 of the image forming apparatus 101 is notified from the image forming apparatus 101 to the information processing apparatus 103, 104, or 105 as capability information with being associated with the name of the collective setting. The information processing apparatus 103, 104, or 105 stores the notified detailed information regarding setting items into the extended attribute management unit 514, and simultaneously displays setting items with vendor extended attributes on a print setting screen via an extended attribute display unit 516. The user performs a print setting on the print setting screen and performs printing.

The print screen control unit 510 and the print job generation unit 505 generate a job attribute and a document attribute of an IPP job based on the setting items on the print setting screen. Collective settings supported by the image forming apparatus 101 are acquired. In addition to the collective settings, print attributes normally defined by the IPP that have been changed in setting immediately before printing, and vendor extended attributes are acquired, and an attribute is designated for each job or each page in print data.

If a collective setting having the Finishing-Template format is selected by the user, the print screen control unit 510 and the print job generation unit 505 notify information regarding vendor-unique setting items to the information processing apparatus 103, 104, or 105 in addition to a set name of the collective setting. On the other hand, if a collective setting having the IPP-Preset format is selected by the user, the print screen control unit 510 and the print job generation unit 505 designate both of an IPP standard attribute and a vendor extended attribute that are included in the collective setting, for each job or each page in print data. At this time, as for the designated attribute, both of an IPP standard attribute and a vendor-unique setting item are reflected in the print setting screen. If the user changes a setting value in such a manner that the setting value is reflected again as an attribute of a print job, the changed value is reflected as-is.

In cooperation with a PDL generation unit 508, a page generation unit 507 converts drawing data generated by the print application 501 via an OS drawing engine 530, into PDL data supported by the image forming apparatus 101, and transmits the PDL data to the image forming apparatus 101.

In accordance with a request from the print application 501, the OS drawing engine 530 draws print page data in an OS-standard drawing format, and delivers the print page data to the page generation unit 507 of the OS print framework 502. The data communication control unit 520 transmits and receives messages for printer management and job transmission and job management that are generated by the IPP client control unit 503, to and from the image forming apparatus 101.

A method of registering a preset or a template being a collective setting, into an image forming apparatus will be described with reference to FIG. 6. FIG. 6 illustrates an example of a screen to be displayed on the touch panel 318 by accessing the image forming apparatus 101 from any of the information processing apparatuses 103, 104, and 105 via a network, and logging into the image forming apparatus 101. The authentication for login is executed by comparing information regarding a user name and a password that have been entered by the user, with a user management table 1110 to be described below with reference to FIG. 11A.

An entry field 601 is a field for entering an arbitrary collective setting name to be allocated to a collective setting to be registered. The name entered into the entry field 601 is notified to the information processing apparatus 103, 104, or 105, and displayed on the print setting screen as a selectable collective setting.

A selection checkbox 602 is a checkbox for setting whether to notify a collective setting to be registered, to the information processing apparatus 103, 104, or 105 as an IPP-Preset, or notify the collective setting to the information processing apparatus 103, 104, or 105 as a Finishing-Template. If the IPP-Preset is selected, the image forming apparatus 101 notifies the name of a collective setting, and set setting items and setting values to the information processing apparatus 103, 104, or 105. If the Finishing-Template is selected, the name of the collective setting is notified to the information processing apparatus 103, 104, or 105.

A selection checkbox 603 is a checkbox for selecting an individual setting item desired to be included in the collective setting.

A setting item name 609 is a name of a setting item settable as a collective setting. The setting item name 609 includes setting items that are defined by the IPP, and can be displayed on a print setting screen provided by an OS even if the names of items, data types, and value ranges are not acquired from the image forming apparatus 101. In addition, the setting item name 609 includes items undefined by the IPP, and names of items provided from a printing apparatus, and items related to data types and value ranges of the above-described items, in the display on a print setting screen provided by an OS, like Opening Style 607 and Creep Correction 608. The Opening Style 607 is an opening direction of an output product in bookbinding printing, and a setting value can be selected from among right opening, left opening, upward opening, and downward opening. The Creep Correction 608 is a setting for adjusting a printing position of an image on a sheet in bookbinding printing. The user can set a printing position in millimeters.

A value range selection list and entry field 604 is a region for selecting or entering a setting value of each setting item included in the collective setting.

A selection checkbox 605 is a checkbox for selecting whether to make a setting value of a setting item included in the collective setting, changeable for each job immediately before printing. If the selection checkbox 605 is selected, after a collective setting to be used for printing is selected on the information processing apparatus 103, 104, or 105, the user can change a setting value of a setting item included in the selected collective setting.

If a setting item or a setting value set by the checkbox to be changeable immediately before printing is a vendor-unique setting item or setting value undefined as an IPP standard, the image forming apparatus 101 notifies the name, the data type, the value range, and the default value of the setting item to the information processing apparatus 103, 104, or 105. The user can thereby change a print setting included in the collective setting, by operating the information processing apparatus 103, 104, or 105, even if the print setting is not a setting item defined by the IPP.

An "Add" button 606 is a button for registering a template or a preset being a collective setting, into the preset/template DB 416. If the user selects the "Add" button 606, a setting set on the registration screen 600 is registered into the preset/template DB 416.

In this manner, in the present exemplary embodiment, a collective setting for handling a plurality of setting items as one set can include vendor-unique setting items, and it can be set whether to allow these items to be changed in setting before printing. The image forming apparatus 101 notifies information necessary for setting a vendor-unique setting item allowed to be changed before printing, to the information processing apparatus 103. By the information processing apparatus 103 displaying a setting screen based on the information provided from the image forming apparatus 101, the setting of the vendor-unique setting item can be changed in a predetermined print service provided by an OS.

Processing in which the image forming apparatus 101 stores data of a collective setting into the preset/template DB 416 and the extended attribute DB 417 will be described with reference to FIG. 7. The processing illustrated in FIG. 7 can be executed by the CPU 211 controlling the Web UI control unit 415 of the image forming apparatus 101.

The processing illustrated in FIG. 7 is started in accordance with the "Add" button 606 being selected on the registration screen 600 illustrated in FIG. 6.

In step S711, the Web UI control unit 415 extracts a name of a collective setting set in the entry field 601 of the registration screen 600, and setting items selected in the selection checkbox 603.

In step S712, the Web UI control unit 415 determines whether one setting item of the setting items extracted in step S711 is a setting item including a setting value allowed to be changed before printing. Referring to the selection checkbox 605 of the setting item, the Web UI control unit 415 determines whether the checkbox is selected. If the selection checkbox 605 is selected (YES in step S712), the Web UI control unit 415 advances the processing to step S713. On the other hand, if the selection checkbox 605 is not selected (NO in step S712), the Web UI control unit 415 advances the processing to step S714.

In step S713, the Web UI control unit 415 stores, for the setting item including the setting value determined in step S712 to be allowed to be changed before printing, an attribute ID indicating a setting item, a default value indicating a setting value, and a prior change flag indicating a setting value change before printing, into the extended attribute DB 417. The details of information to be stored into the extended attribute DB 417 will be described below with reference to a collective setting management table 1120 and a collective attribute management table 1140 illustrated in FIG. 11B. In step S713, the prior change flag is set to YES because a setting value is allowed to be changed before printing.

In step S714, the Web UI control unit 415 stores, for the setting item including the setting value determined in step S712 not to be allowed to be changed before printing, an attribute ID indicating a setting item, a default value indicating a setting value, and a prior change flag indicating a setting value change before printing, into the extended attribute DB 417. The details of information to be stored into the extended attribute DB 417 will be described below with reference to the collective setting management table 1120 and the collective attribute management table 1140 illustrated in FIG. 11B. In step S714, the prior change flag is set to NO because a setting value is not allowed to be changed before printing.

In step S715, the Web UI control unit 415 determines whether the processing in step S712 has been performed on all the setting items extracted in step S711. If the registration of all the setting items set on the registration screen 600 into the extended attribute DB 417 has been completed (YES in step S715), the Web UI control unit 415 completes the processing illustrated in FIG. 7. If the processing of any setting item has not been completed (NO in step S715), the Web UI control unit 415 returns the processing to step S712, and executes the processing in step S712 and the subsequent steps.

By the above-described processing, a collective setting registered as a preset or a template can be stored.

Next, a print setting regarding printing in an image forming apparatus in which a preset or a template is registered will be described with reference to FIGS. 8A to 8C. FIGS. 8A to 8C illustrate an example of a print screen provided by an OS of the information processing apparatus 103, 104, or 105 supporting two collective setting methods corresponding to an IPP-Preset (preset) and a Finishing-Template (template). The description will be given using the information processing apparatus 103 as an example.

A screen 800 is a print setting screen to be displayed when the user issues a printing instruction of data from an application.

A printer selection region 803 is a region for selecting an image forming apparatus to which the information processing apparatus 103 can transmit print data. By selecting an object 804, a list of image forming apparatuses to be used for printing is displayed, and the user can select an image forming apparatus to be used for printing, from among the displayed image forming apparatuses. Objects on screens 800, 810, 820, 830, 840, and 850 that have similar shapes to the object 804 are buttons for displaying a list of options for a corresponding setting item.

A preset selection region 801 is a region for selecting a preset to be used for setting, from among IPP-Presets registered in an image forming apparatus. If the user selects an object in the preset selection region 801, the screen 820 is displayed. The user selects a preset desired to be used, from a list of names of IPP-Presets that has been acquired from the image forming apparatus 101. If the user selects a preset, a setting corresponding to the selected preset is displayed on the screen 820. For example, if "Sided" corresponding to "com.canon.oip.grpsetting002" registered in the collective setting management table 1120 illustrated in FIG. 11A is selected, the screen 850 is displayed. On the screen 850, a setting corresponding to the selected Sided is displayed, and "Two-Sided" is set to "Long Edge" of two-sided printing for left opening. In addition, as for a setting item not set in a preset, a value set by default is set. For the preset "com.canon.oip.grpsetting002", toner save for suppressing toner consumption in printing, and a Store function for storing print data into the image forming apparatus 101 are enabled, and a Box 1 is designated as a storage location. Nevertheless, these setting items are not displayed on the screen 850.

If the user selects an option button 851, the screen 840 is displayed. On the screen 840, settings of setting items that cannot be displayed on the screen 850 provided by an OS of the information processing apparatus 103 are displayed. In a region 841, the name of the selected preset is displayed. Regions 842 and 843 are regions to be displayed based on an attribute ID, a data type, a default value, and a value range that have been acquired from the image forming apparatus 101. The region 842 is a region for setting an enabled state or a disabled state of the Store function. As a default value, "ON" set by the user on the registration screen 600 is displayed. If the user selects an object in the region 842, value ranges notified from the image forming apparatus 101 are displayed as settable options, and the user can change a setting before issuing a printing instruction. The region 843 is a region in which the number of a box serving as a storage location can be set. As a default value, a value set by the user on the registration screen 600 is displayed. A numerical value 844 is a value notified from the image forming apparatus 101 as a value range, and is information indicating a range of a numerical value settable for the setting item. After the user completes the setting, the user selects a "close" 845 button. If the "close" 845 button is selected, the information processing apparatus 103 displays the screen 850. The user performs other print settings, and selects a "Print" button 852 to issue a print execution instruction.

Next, a case where a template is to be used will be described. The user selects an option button 802 on the screen 800 without selecting a preset. In the present exemplary embodiment, only either one of a preset and a template can be used. Thus, if a template is to be used, the option button 802 is selected without selecting a preset in the preset selection region 801, or the option button 802 is selected after cancelling the selection of a preset.

If the user selects the option button 802, the screen 810 is displayed. The screen 810 is a screen for selecting a Finishing-Template to be used. If an object in a region 811 is selected, a list of templates that has been acquired from the image forming apparatus 101 is displayed. The user selects a template to be used for a print setting, from the displayed list. If the user selects a template, the screen 830 is displayed. For returning to the previous screen without selecting a template, the user selects a "close" button 812.

A region 831 is a region in which a template to be used is selected. If the user selects an object in the region 831, a name list of templates is displayed, and the user can select a template to be used. On the screen 830, a template in which "Booklet" is set as a name, left opening in bookbinding printing is set, a creep amount is set to 0.1 mm, and all setting items are allowed to be changed in setting before printing is selected.

A region 832 is a region in which a name and a default value of a setting item included in the template that has a changeable setting are displayed. If the user selects an object in the region 832, value ranges notified from the image forming apparatus 101 are displayed as settable options.

A region 833 is a region in which a name and a default value of a setting item included in the template that has a changeable setting are displayed. In the region 833, a numerical value range registered in the image forming apparatus 101 as a value range is displayed as a numerical value range (0.00-10.00) settable on the screen 830. If the user selects a "close" button 834, the screen 800 is displayed. After the user performs other print settings, the user selects a "Print" button 805 to issues a print execution instruction. Setting items defined by the IPP that are included in a template are not displayed on the print setting screen of the information processing apparatus 103, and the settings of the setting items are not allowed to be changed before printing.

The above is the overview of processing in which the user operates the information processing apparatus 103 and issues an execution instruction of printing that uses a preset or a template.

Figure 9B:
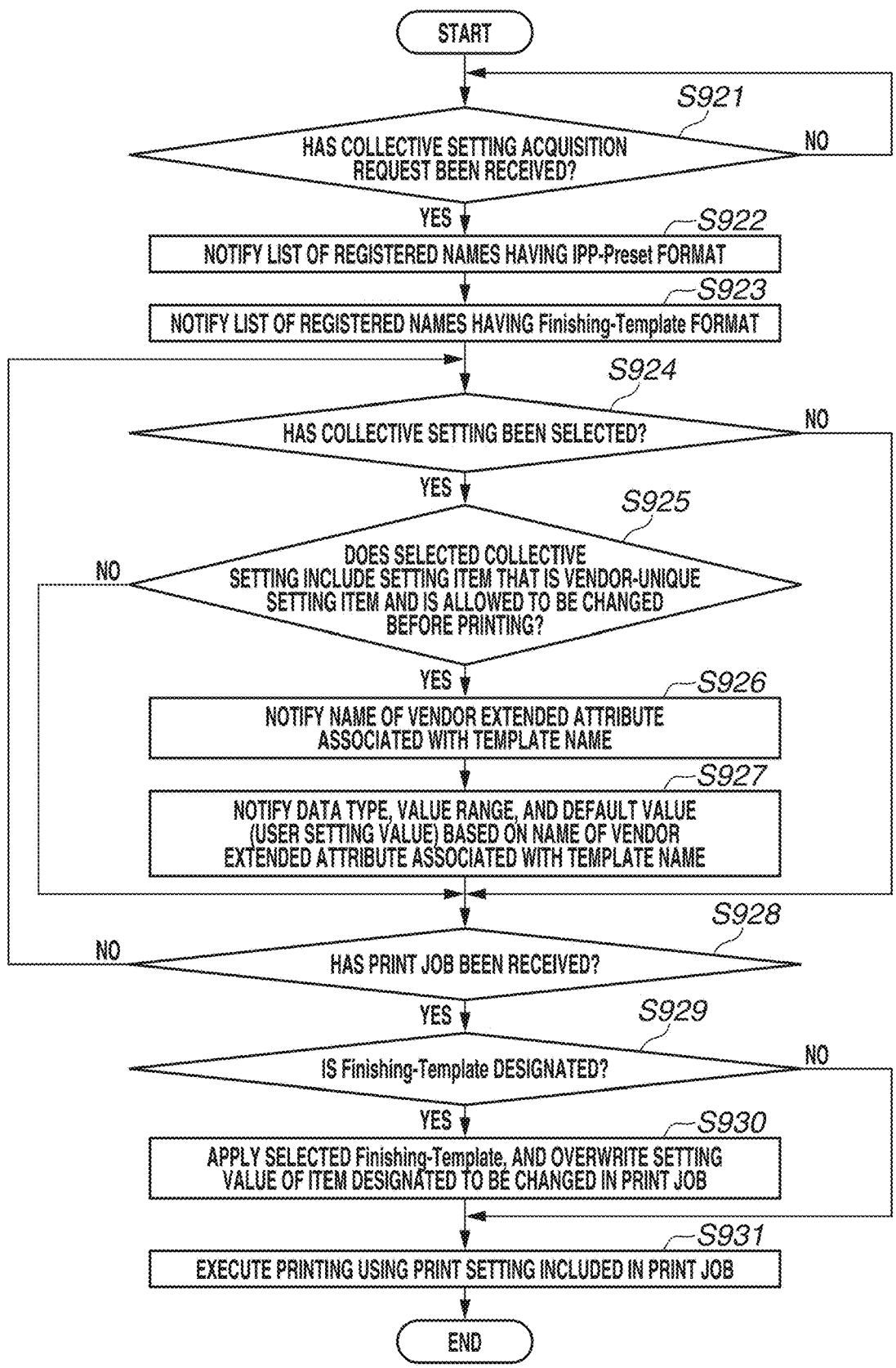

Next, processing in which a print setting is performed in the information processing apparatus 103, and a printing instruction is issued will be described with reference to FIGS. 9A and 9B. The processing illustrated in FIG. 9A is implemented by the CPU 311 controlling each software module illustrated in FIG. 5.

In step S901, the print screen control unit 510 receives an instruction for opening the print screen 800, from an application on the information processing apparatus 103, and displays a screen illustrated as the print screen 800.

In step S902, the print screen control unit 510 controls the IPP client control unit 503 to acquire, from the IPP server control unit 401 of the image forming apparatus 101, information regarding collective settings registered in the collective setting management table 1120 stored in the preset/template DB 416. The print screen control unit 510 notifies a user ID of a user who has logged into the information processing apparatus 103, to the image forming apparatus 101, and acquires a name of a collective setting corresponding to the user ID. At this time, as for a collective setting set as an IPP-preset, a name of a preset, and names and default values of setting items defined by the IPP that are associated with the preset are acquired. As for a collective setting set as a Finishing-Template, only a name of a template is acquired.

In step S903, the print screen control unit 510 receives the selection of a collective setting to be used for print setting, from the user. The print screen control unit 510 displays the screen 820 or the screen 810, and receives the selection of a collective setting. A collective setting to be selected in this step may be an IPP-Preset or may be a Finishing-Template.

In step S904, the print screen control unit 510 determines whether the selected collective setting is a collective setting having the IPP-Preset format. The information regarding collective settings that has been acquired in step S902 includes information indicating whether each collective setting is a collective setting having the IPP-Preset format or a collective setting having the Finishing-Template format. Referring to the above-described information, the print screen control unit 510 determines whether the selected collective setting is a collective setting having the IPP-Preset format. If the selected collective setting is a collective setting having the IPP-Preset format (YES in step S904), the print screen control unit 510 advances the processing to step S905. If the selected collective setting is not a collective setting having the IPP-Preset format (NO in step S904), because the selected collective setting is a collective setting having the Finishing-Template format, the print screen control unit 510 advances the processing to step S906.

In step S905, the print screen control unit 510 reflects default values of setting items defined by the IPP that are included in the information regarding collective settings that has been acquired in step S902, in the print setting screen provided by the OS, and displays the screen 850. Setting items that correspond to the selected collective setting, and are settable on the print screen 800 displayed by the OS are displayed as changeable even if a setting for allowing the setting items to be changed in setting before printing is not performed on the registration screen 600.

In step S906, the extended attribute display unit 516 transmits, to the image forming apparatus 101, an acquisition request for a name of a vendor-unique setting item that is a setting item corresponding to the collective setting selected in step S903, and is a setting item allowed to be changed in setting before printing. An acquisition result is stored into the extended attribute management unit 514.

In step S907, the extended attribute display unit 516 acquires, from the image forming apparatus 101, information regarding a data type, a default value, and a value range of the setting item acquired in step S906. An acquisition result is similarly stored into the extended attribute management unit 514.

In step S908, the extended attribute display unit 516 displays a screen (e.g., the screen 830 or the screen 840) on which a setting value of a vendor-unique setting item corresponding to the selected collective setting illustrated on the screen 810 or 820 can be entered. On the screen, setting values set on the registration screen 600 are displayed as default values. As for a setting item of which a setting value is to be selected from among a plurality of options, an instruction for a setting change is received from the user, a list of options is displayed, and a setting is changed to an option selected by the user. As for setting items of which setting values are to be entered, available values or character types are displayed, and the entry of numbers or characters to be set as a setting value is received from the user.

In step S909, a printing instruction is received from the user, and the print job generation unit 505 generates a print job. If a print setting is changed on the screen 800, 820, 830, or 840, a print job is generated using a changed setting value.

In step S910, the PDL generation unit 508 determines whether a collective setting is set in a print setting, and if a collective setting is set, determines whether a format of the selected collective setting is the IPP-Preset format or the Finishing-Template format. If the set collective setting is a collective setting having the IPP-Preset format ("IPP-Preset FORMAT" in step S910), the PDL generation unit 508 advances the processing to step S911. If the set collective setting is a collective setting having the Finishing-Template format ("Finishing-Template FORMAT" in step S910), the PDL generation unit 508 advances the processing to step S912. If neither a collective setting having the IPP-Preset format nor a collective setting having the Finishing-Template format is set ("COLLECTIVE SETTING UNSET" in step S910), the PDL generation unit 508 advances the processing to step S913.

In step S911, the PDL generation unit 508 acquires setting values of the setting items corresponding to the selected preset that are set on the screen 850 or 840, from the print screen control unit 510, and adds the setting values to the print job. At this time, as for setting items that are setting items corresponding to the selected preset, and are vendor-unique setting items not allowed to be changed before printing, values notified from the image forming apparatus 101 are added to the print job even if the values are not displayed on the screen. In addition, as for setting items not changed in setting by the user, the unchanged values are added to the print job. If a preset is to be used, the name of the preset does not need to be added to the print job.

In step S912, the PDL generation unit 508 adds the name of the selected template, and names and setting values of vendor-unique setting items to the print job. As for vendor-unique setting items set on the registration screen 600 to be allowed to be changed before printing, attribute values and setting values of the items are added to the print job. As for setting items to be displayed on the print setting screen provided by the OS, values set on the print setting screen are added to the print job.

In step S913, the PDL generation unit 508 acquires setting values of setting items defined by the IPP immediately before printing, from the print screen control unit 510, and adds the setting values to the print job.

In step S914, the print job generated by the print job generation unit 505 is transmitted to the image forming apparatus 101 via the print spooler 509. By the above-described processing, the information processing apparatus 103 can transmit a print job including a print setting set using a collective setting, to the image forming apparatus 101.

Next, processing performed by the image forming apparatus 101 while the information processing apparatus 103 displays the print setting screen and generates a print job will be described with reference to FIG. 9B. The processing illustrated in FIG. 9B is implemented by the CPU 211 controlling each module illustrated in FIG. 4.

In step S921, the printer capability notification unit 402 determines whether an acquisition request for a collective setting has been received from the information processing apparatus 103. If an acquisition request for a collective setting has not been received (NO in step S921), the printer capability notification unit 402 repeatedly performs the processing in step S921.

If an acquisition request for a collective setting has been received (YES in step S921), the printer capability notification unit 402 executes processing in step S922. More specifically, referring to the preset/template DB 416, the printer capability notification unit 402 extracts a collective setting key 1125 of a collective setting that is registered in the collective setting management table 1120 to be described below with reference to FIG. 11A, and has "preset" set as a type 1124. Furthermore, referring to the collective attribute management table 1140, the printer capability notification unit 402 acquires a default value of a setting item that is set for the extracted collective setting, and has "NO" set as an extended attribute 1133 in a collective attribute master table 1130. Then, the printer capability notification unit 402 notifies the extracted collective setting key and the default value of the setting item defined by the IPP, to the information processing apparatus 103.

In step S923, referring to the preset/template DB 416, the printer capability notification unit 402 extracts the collective setting key 1125 of a collective setting that is registered in the collective setting management table 1120 illustrated in FIG. 11A, and has "fin-template" set as the type 1124. Then, the printer capability notification unit 402 notifies the extracted collective setting key 1125 to the information processing apparatus 103.

In step S924, the printer capability notification unit 402 determines whether a collective setting key of a collective setting selected on the print setting screen has been received from the information processing apparatus 103. If the collective setting key has not been received (NO in step S924), the printer capability notification unit 402 advances the processing to step S928.

If the collective setting key has been received (YES in step S924), the printer capability notification unit 402 advances the processing to step S925. In step S925, the printer capability notification unit 402 determines whether the selected collective setting includes a setting item that is a vendor-unique setting item, and is allowed to be changed before printing. The printer capability notification unit 402 refers to the collective attribute management table 1140 and the collective attribute master table 1130. The printer capability notification unit 402 determines whether the selected collective setting includes a setting item that has an attribute ID corresponding to the collective setting key notified from the information processing apparatus 103 in step S924, and has YES set as a prior change 1143 and YES set as the extended attribute 1133. If the selected collective setting does not include a setting item that is a setting item corresponding to the notified collective setting, and is a vendor-unique setting item allowed to be changed in setting before printing (NO in step S925), the printer capability notification unit 402 advances the processing to step S928. If the selected collective setting includes a setting item that is a setting item corresponding to the notified collective setting, and is a vendor-unique setting item allowed to be changed in setting before printing (YES in step S925), the printer capability notification unit 402 advances the processing to step S926.

In step S926, the printer capability notification unit 402 notifies a name of a setting item that is a vendor-unique setting item corresponding to the selected collective setting, and is allowed to be changed in setting immediately before printing, to the information processing apparatus 103. In this step, the printer capability notification unit 402 notifies an attribute key 1132 of a setting item that is a vendor-unique setting item corresponding to the selected collective setting, and is allowed to be changed in setting immediately before printing, to the information processing apparatus 103.

In step S927, the printer capability notification unit 402 notifies a data type, a value range, and a default value of the vendor-unique setting item notified in step S926, to the information processing apparatus 103. Referring to the collective attribute master table 1130, the printer capability notification unit 402 notifies a data type 1134 and a value range 1135 of the attribute key 1132 corresponding to the setting item notified in step S926, to the information processing apparatus 103. Furthermore, referring to the collective attribute management table 1140, the printer capability notification unit 402 notifies a default value 1144 corresponding to the selected collective setting ID notified in step S926, to the information processing apparatus 103.

In step S928, the print job generation unit 404 determines whether a print job has been received from the information processing apparatus 103. If the print job generation unit 404 has not received a print job (NO in step S928), the print job generation unit 404 returns the processing to step S924. If a print job has been received (YES in step S928), the print job generation unit 404 advances the processing to step S929.

In step S929, the print job generation unit 404 determines whether the received print job includes a name of a Finishing-Template for identifying the Finishing-Template. If the received print job does not include the name of the Finishing-Template (NO in step S929), the print job generation unit 404 advances the processing to step S931.

If the received print job includes the name of the Finishing-Template (YES in step S929), the print job generation unit 404 advances the processing to step S930. In step S930, the print job generation unit 404 reads the Finishing-Template with the received name from the preset/template DB 416, and applies the Finishing-Template to the print job. At this time, as for a setting item that is a vendor-unique setting item corresponding to the Finishing-Template, and is allowed to be changed in setting before printing, values set in the received print job are set. On the other hand, as for a setting item that is a vendor-unique setting item corresponding to the Finishing-Template, and is not allowed to be changed in setting before printing, setting values stored in the preset/template DB 416 are set in the print job. With this configuration, among setting items collectively set as a template, a part of vendor-unique setting items can be made changeable on the print setting screen while a part of vendor-unique setting items can be made unchangeable on the print setting screen.

In step S931, the print job generation unit 404 executes printing based on a print job received from the information processing apparatus 103, or a print job to which the settings are added in step S930.

By the above-described processing, the image forming apparatus 101 can execute printing using a collective setting. In the present exemplary embodiment, only for a vendor-unique setting item set as a collective setting, information necessary for changing the setting of the vendor-unique setting item is transmitted from an image forming apparatus to an information processing apparatus. In this manner, by restricting information to be provided from the image forming apparatus to the information processing apparatus, information necessary for displaying a screen for changing the setting of a vendor-unique setting item can be reduced, and the screen for changing the vendor-unique setting item can be promptly displayed.

Figure 10B:
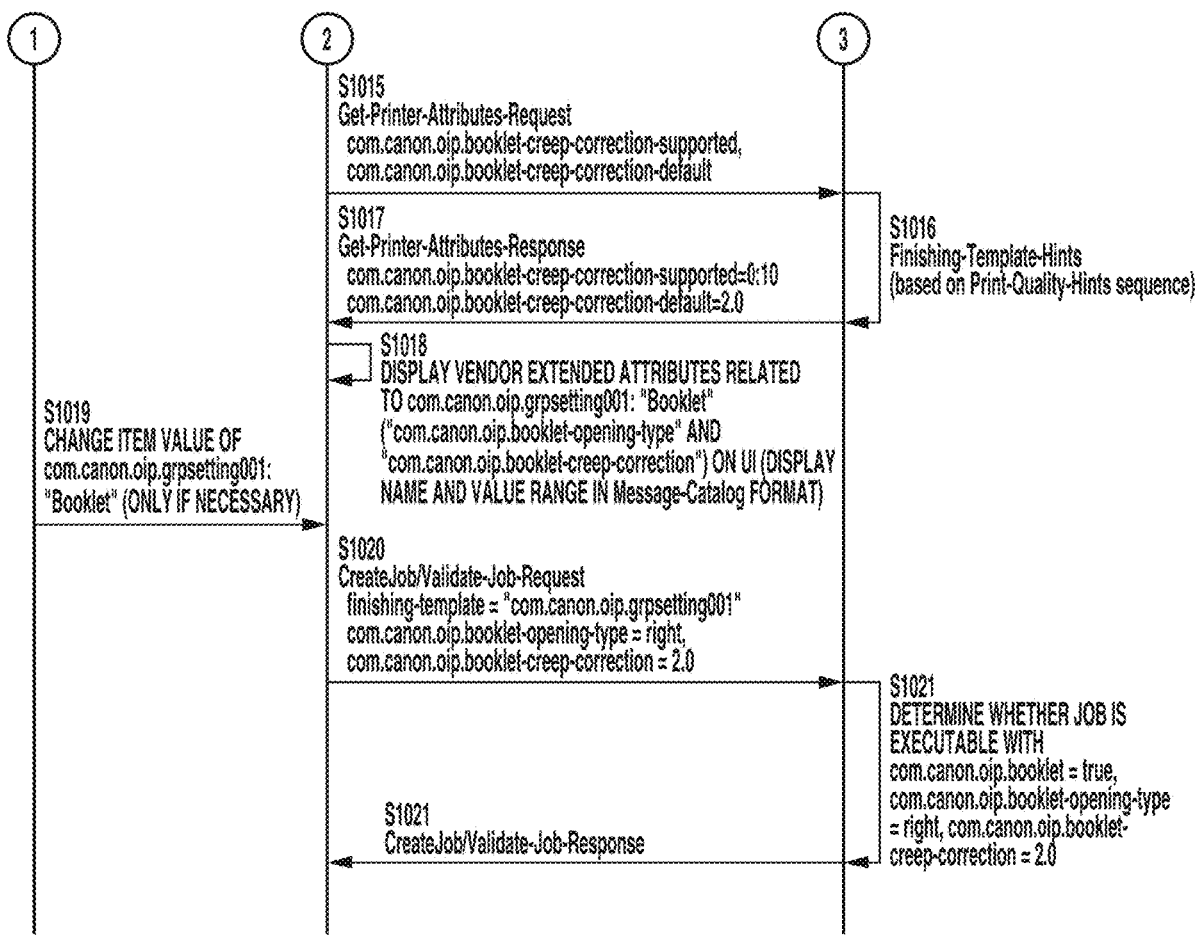

FIGS. 10A and 10B are a sequence diagram illustrating processing performed between the image forming apparatus 101 and the information processing apparatus 103 when the print setting screen illustrated in FIGS. 8A to 8C is displayed.

In step S1001, the printer information management unit 504 inquires of the printer capability notification unit 402 of the image forming apparatus 101 whether a collective setting having the IPP-Preset format is supported, and whether a collective setting having the Finishing-Template format is supported. Furthermore, the printer information management unit 504 inquires of the image forming apparatus 101 about supported languages in a Message-Catalog format. At this time, the information processing apparatus 103 notifies identification information of a user who has logged into the information processing apparatus 103, to the image forming apparatus 101.

In step S1002, referring to the collective setting management table 1120, the printer capability notification unit 402 returns a setting key of a collective setting corresponding to the user ID notified from the image forming apparatus 101, to the image forming apparatus 101. The printer capability notification unit 402 notifies the information processing apparatus 103 that "com.canon.oip.grpsetting002" is registered as an IPP-Preset, and two-sided printing with a binding margin set to a short side is set as a setting item defined by the IPP. Among settings associated with "com.canon.oip.grpsetting002", a vendor-unique item having YES as the extended attribute 1133 is not notified. Furthermore, the printer capability notification unit 402 notifies the information processing apparatus 103 that "com.canon.oip.grpsetting001" is registered as a Finishing-Template. As for the Finishing-Template, setting items and setting values are not notified regardless of whether the extended attribute 1133 is set to YES or NO. The printer capability notification unit 402 also notifies the information processing apparatus 103 that "English" and "Japanese" are supported, as language information supported in the Message-Catalog format.

In step S1003, the printer information management unit 504 of the information processing apparatus 103 notifies the image forming apparatus 101 of a language in which display is to be performed, among the notified supported languages. In this example, the printer information management unit 504 notifies the image forming apparatus 101 that display is to be performed in English (en). The image forming apparatus 101 identifies a uniform resource identifiers (URI) for acquiring a message catalog to be notified to the information processing apparatus 103, based on the received information regarding language display. The message catalog is text information to be used when the information processing apparatus 103 displays attribute information notified from the image forming apparatus 101. For example, the message catalog is a message catalog listed in a table as illustrated in a message catalog table 1150 illustrated in FIG. 11B.

In step S1004, the printer capability notification unit 402 of the image forming apparatus 101 notifies a URL for acquiring a message catalog table, to the information processing apparatus 103.

In step S1005, the print screen control unit 510 accesses the URI notified in step S1004, and transmits an acquisition request for an English message catalog to the image forming apparatus 101.

In step S1006, the printer capability notification unit 402 of the image forming apparatus 101 returns the message catalog table 1150 illustrated in FIG. 11B, to the information processing apparatus 103.

In step S1007, the print screen control unit 510 of the information processing apparatus 103 displays a print setting screen in accordance with the acquired message catalog. The print screen control unit 510 can thereby display "Booklet" as "com.canon.oip.grpsetting001". Furthermore, the information processing apparatus 103 can display "Sides" as "com.canon.oip.grpsetting002" notified from the image forming apparatus 101.

An example case where the user performs a print setting using a Finishing-Template will be described.

In step S1008, the user selects the collective setting: "Booklet" having the Finishing-Template format, in the region 811 of the screen 810.

In step S1009, the printer information management unit 504 of the information processing apparatus 103 transmits an acquisition request for information regarding a vendor-unique setting item corresponding to the collective setting key "com.canon.oip.grpsetting001", to the image forming apparatus 101.

The printer capability notification unit 402 of the image forming apparatus 101 extracts a setting item that is a vendor-unique setting item corresponding to "com.canon.oip.grpsetting001", and is allowed to be changed in setting before printing. The vendor-unique setting item corresponding to "com.canon.oip.grpsetting001" is identified from the collective attribute management table 1140 illustrated in FIG. 11B. In this example, "com.canon.oip.booklet", "com.canon.oip.booklet-opening-type", and "com.canon.oip.booklet-creep-correction" are identified. Because "com.canon.oip.booklet" is not allowed to be changed in setting before printing, among these vendor-unique setting items, "com.canon.oip.booklet" is not notified to the information processing apparatus 103.

In step S1011, the printer capability notification unit 402 notifies "com.canon.oip. booklet-opening-type" and "com.canon.oip.booklet-creep-correction" to the information processing apparatus 103.

In step S1012, upon receiving a request from the extended attribute display unit 516, the printer information management unit 504 of the information processing apparatus 103 transmits a request for a data type, a value range, and a default value of "com.canon.oip.booklet-opening-type", to the image forming apparatus 101.

In step S1013, the printer capability notification unit 402 extracts the data type 1134 and the value range 1135 corresponding to "com.canon.oip.booklet-opening-type", referring to the collective attribute master table 1130. Then, in step S1014, the printer capability notification unit 402 notifies the data type, the value range, and the default value to the information processing apparatus 103.

In step S1015, upon receiving a request from the extended attribute display unit 516, the printer information management unit 504 of the information processing apparatus 103 transmits a request for a data type, a value range, and a default value of "com.canon.oip.booklet-creep-correction", to the image forming apparatus 101.

In step S1016, the printer capability notification unit 402 extracts the data type 1134 and the value range 1135 corresponding to "com.canon.oip.booklet creep-correction", referring to the collective attribute master table 1130. Then, in step S1017, the printer capability notification unit 402 notifies the data type, the value range, and the default value to the information processing apparatus 103.

In step S1018, the print screen control unit 510 and the extended attribute display unit 516 of the information processing apparatus 103 reloads a message catalog, and displays a print setting screen including vendor-unique setting items. The vendor-unique setting item "com.canon.oip-.booklet-opening-type" is displayed as "OpeningType". In addition, the vendor-unique setting item "com.canon.oip-.booklet-creep-correction" is displayed as "CreepCorrection". Value ranges and default values are similarly reflected in a list menu from the message catalog.

In step S1019, the user corrects as necessary a value of a vendor extended attribute included in the collective setting: Booklet. For example, the user changes an opening direction of the Booklet to Right, and corrects a creep correction amount to 2.0 mm.

In step S1020, the print job generation unit 505 generates a print job including setting values set on the print setting screen, and transmits the print job to the image forming apparatus 101 via the print spooler 509. Using the print job, the collective setting key of the used Finishing-Template and changed setting values are notified to the image forming apparatus 101.

The print job generation unit 404 of the image forming apparatus 101 adds settings of setting items that are setting items corresponding to the notified Finishing-Template, and are not allowed to be changed in setting before printing, to the received print job referring to the collective attribute management table 1140. In this example, a print setting "com.canon.oip.booklet=true" is added. After adding the print setting, the image forming apparatus 101 executes processing necessary for printing, and notifies an execution result to the information processing apparatus 103.

A difference between a case where an IPP-Preset is used as a collective setting, and a case where a Finishing-Template is used as a collective setting lies in processing performed when an IPP-Preset to be used is selected in step S1008. If an IPP-preset is selected, setting items and setting values notified in step S1002 are reflected in the print setting screen. Thus, in the IPP-Preset, an IPP attribute can also be changed in setting before printing.

Lastly, tables managed by the preset/template DB 416 of the image forming apparatus 101 will be described with reference to FIGS. 11A and 11B. The tables illustrated in FIGS. 11A and 11B are stored on the storage 214 of the image forming apparatus 101. The CPU 211 updates table information in the storage 214 by loading the table information onto the RAM 213, and reflects the updated table information in stored data in the storage 214.

The user management table 1110 will be described. The user management table 1110 includes, for each record, a user ID 1111 for uniquely identifying a user, a password 1112 of the user, and a user name 1113. Because the user ID is used for identifying a registrant of each collective setting in the collective setting management table 1120, a unique ID is automatically allocated while avoiding overlap. The Web UI control unit 415 can access the registration screen 600 of collective settings only if the user name 1113 and the password 1112 match. The user ID is used also when a user who has registered a collective setting is to be managed.

The collective setting management table 1120 is a table for managing a collective setting such as a template or a preset. A registrant ID 1121 is information indicating a user who has performed a collective setting via the registration screen 600. A collective setting ID 1122 is information for identifying a collective setting registered in the registration screen 600, and is an ID used in common among a plurality of tables illustrated in FIG. 11A. The type 1124 is information indicating whether a registered collective setting is an IPP-Preset or a Finishing-Template. The type "fin-template" indicates that a registered collective setting is a Finishing-Template. The type "preset" indicates that a registered collective setting is an IPP-Preset. A collective setting name 1123 is a name of a collective setting that has been entered on the registration screen 600. The name is also registered in the message catalog table 1150 to be described below. The collective setting key 1125 is a character string for identifying the collective setting, and is one of identification information identifying the collective setting.

The collective attribute master table 1130 is a table indicating names, data types, and value ranges of setting items defined by the IPP, and vendor-unique setting items. An attribute ID 1131 is identification information unique to a setting item. The attribute ID is used in common among the tables illustrated in FIG. 11A. An attribute key 1132 is a character string indicating a setting item that is used when the image forming apparatus 101 notifies capability information to the information processing apparatus 103. An extended attribute 1133 is information indicating whether each setting item is a setting item defined by the IPP, or a vendor-unique setting item. An extended attribute "YES" indicates that the setting item is a vendor-unique setting item. On the other hand, an extended attribute "NO" indicates that the setting item is a setting item defined by the IPP. The data type 1134 indicates a data type set when the setting item is set. It is indicated that either "true" or "false" can be set as Boolean. A data type "Integer" indicates that an integer value can be set. Data types "Type2 Keyword" and "Type3 Keyword" indicate that value ranges are represented based on the format defined by the IPP.

The collective attribute management table 1140 indicates setting items and default values that are set for each of the collective settings registered in the collective setting management table 1120. Because one collective setting includes one or more attributes, for acquiring information regarding one collective setting, the printer capability notification unit 402 acquires a plurality of records.

A collective setting ID 1141 and the collective setting ID 1122 in the collective setting management table 1120 are an ID set in common, and the collective setting ID 1141 indicates a collective setting corresponding to a setting of a record. An attribute ID 1142 and the attribute ID 1131 in the collective attribute master table 1130 are an ID set in common, and the attribute ID 1142 is information indicating a set setting item. The prior change 1143 indicates whether a setting value of a setting item is allowed to be changed after the reflection of the collective setting. If the selection checkbox 605 on the registration screen 600 is ticked and a change before printing is allowed, "YES" is set. If the selection checkbox 605 on the registration screen 600 is not ticked and a setting change before printing is not allowed, "NO" is set. The default value 1144 is a default value to be displayed when a collective setting is displayed on the print setting screen. A value set in the value range selection list and entry field 604 of the registration screen 600 is stored as the default value 1144.

The preset/template DB 416 of the image forming apparatus 101 refers to the tables illustrated in FIGS. 11A and 11B, upon receiving an inquiry about an individual vendor extended attribute associated with a collective setting, from the information processing apparatus 103. The image forming apparatus 101 links the attribute ID 1131 in the collective attribute master table 1130 and the attribute ID 1142 in the collective attribute management table 1140 as main keys, and links the collective setting ID 1122 in the collective setting management table 1120, and the collective setting ID 1141 in the collective attribute management table 1140 as main keys. Then, the image forming apparatus 101 searches for attribute information corresponding to a collective setting ID in the three linked tables.

The message catalog table 1150 is a table for converting the collective setting key 1125, the attribute key 1132, and the value range 1135 in the tables illustrated in FIG. 11A, into character strings to be displayed on the print setting screen. The table is created for each supported language. The message catalog table 1150 is a table acquired when the information processing apparatus 103 displays the print setting screen. The table may be managed in a location different from the image forming apparatus 101.

From the description given above, by associating information regarding a vendor extended attribute with the name of a collective setting, and restricting attributes to attributes required to be changed for each job, capability notification between a printing apparatus and an information processing apparatus can be performed based on delivery of requisite minimum vendor extended attributes. This can suppress an amount of data delivered from a printing apparatus to an information processing apparatus. Then, by executing the delivery at a timing at which a collective setting is applied in printing, only vendor extended attributes required to be changed for each job can be reset without reediting or reregistering preliminarily-registered collective settings.

<Other Exemplary Embodiments>

In the present exemplary embodiment, in step S1001 of FIG. 10A, identification information of a user who has logged into the information processing apparatus 103 is transmitted to the image forming apparatus 101, and a collective setting corresponding to the user ID of the user is acquired. In step S1001, information regarding all collective settings registered in the image forming apparatus 101 may be transmitted to the information processing apparatus 103 without transmitting user identification information.

In addition, in the present exemplary embodiment, after the user selects a collective setting to be used, an attribute key, a data type, a value range, and a default value of a vendor-unique setting item corresponding to the selected collective setting are transmitted to the information processing apparatus 103. In step S1002 of FIG. 10A, attribute keys, data types, value ranges, and default values of vendor-unique setting items corresponding to collective settings registered in the image forming apparatus 101 may be transmitted to the information processing apparatus 103.

In the present exemplary embodiment, on the registration screen 600 illustrated in FIG. 6, a setting for allowing a setting change before printing can be performed for all setting items. In accordance with a Type selected by the user, a setting for allowing a setting change may be disabled. For example, if the user selects a Finishing-Template as a template to be used, setting items defined by the IPP such as "Number of Copies" and "2-Sided Printing" cannot be changed on the print setting screen displayed on the information processing apparatus 103. Thus, if a Finishing-Template is selected as the Type 602, "Change by job" of items defined by the IPP may be displayed in a grayout state and made unsettable. In this case, "NO" is set in the prior change 1143 in the collective attribute management table 1140. In addition, in an IPP-Preset, items defined by the IPP are allowed to be changed in setting before printing. Thus, if an IPP-Preset is selected as the Type 602, "Change by job" of items defined by the IPP may be displayed in a grayout state and made unsettable. In this case, "YES" is set in the prior change 1143 in the collective attribute management table 1140.

An exemplary embodiment of the present disclosure can also be implemented by executing the following processing. More specifically, the processing is processing of supplying software (program) for implementing the functions of the above-described exemplary embodiment, to a system or an apparatus via a network or various storage media, and a computer (or a CPU or a micro processing unit (MPU)) of the system or the apparatus reading a program code and executing the program code. In this case, the computer program and a storage medium storing the computer program are included in the present disclosure.

An image forming apparatus according to an exemplary embodiment of the present disclosure can make a part of setting items unchangeable while making a part of setting items changeable when reading a plurality of setting items as a collective setting.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-080776, filed Apr. 30, 2020, which is hereby incorporated by reference herein in its entirety.

What is claimed is:
1. An image forming apparatus comprising:
a memory configured to store first capability information of a first print setting item and second capability information of a second print setting item; and a processor configured to perform operations including:
registering an identifier corresponding to a combination of print setting values including a print setting value of the first print setting item and a print setting value of the second print setting item,
transmitting, to an information processing apparatus, the first capability information and information to be used for displaying an object for setting a print setting value of the first print setting item, wherein the second capability information of the second print setting item is not transmitted to the information processing apparatus, and
receiving, from the information processing apparatus, print setting values including a print setting value of the first print setting item.

2. The image forming apparatus according to claim 1, wherein the combination of print setting values includes another print setting value that the information processing apparatus is able to display another object for setting.

3. The image forming apparatus according to claim 1, wherein the transmitted first capability information includes at least one of a data type, a value range, or a default value of the first print setting item.

4. The image forming apparatus according to claim 1, wherein the information to be used for displaying the object for setting a print setting value of the first print setting item is information indicating an address for acquiring character strings to display the object.

5. The image forming apparatus according to claim 1, wherein the information processing apparatus displays the object for setting a print setting value of the first print setting item based on a user instruction for selecting a transmitted identifier.

6. A control method for an image forming apparatus storing first capability information of a first print setting item and second capability information of a second print setting item, the control method comprising:
registering an identifier corresponding to a combination of print setting values including a print setting value of the first print setting item and a print setting value of the second print setting item;
transmitting to an information processing apparatus, the first capability information and information to be used for displaying an object for setting a print setting value of the first print setting item, wherein the second capability information of the second print setting item is not transmitted to the information processing apparatus; and
receiving, from the information processing apparatus, print setting values including a print setting value of the first print setting item.

7. The control method according to claim 6, wherein the combination of print setting values includes another print setting value that the information processing apparatus is able to display another object for setting.

8. The control method according to claim 6, wherein the transmitted first capability information includes at least one of a data type, a value range, or a default value of the first print setting item.

9. The control method according to claim 6, wherein the information to be used for displaying the object for setting a print setting value of the first print setting item is information indicating an address for acquiring character strings to display the object.

10. The control method according to claim 6, wherein the information processing apparatus displays the object for setting a print setting value of the first print setting item based on a user instruction for selecting a transmitted identifier.

11. The control method according to claim 6, wherein receiving includes receiving, from the information processing apparatus, image data that is to be processed based on the received print setting values.

12. The control method according to claim 6, wherein the information to be used for displaying the object is a Uniform Resource Locator (URL) for obtaining character strings corresponding to print setting values of the first print setting item.

13. The control method according to claim 6, wherein the object is displayed based on the transmitted first capability information and the transmitted information.

14. A non-transitory computer-readable storage medium storing a program for causing a computer to execute a control method for an image forming apparatus storing first capability information of a first print setting item and second capability information of a second print setting item, the control method comprising:
registering an identifier corresponding to a combination of print setting values including a print setting value of the first print setting item and a print setting value of the second print setting item;
transmitting, to an information processing apparatus, the first capability information and information to be used for displaying an object for setting a print setting value of the first print setting item, wherein the second capability information of the second print setting item is not transmitted to the information processing apparatus; and
receiving, from the information processing apparatus, print setting values including a print setting value of the first print setting item.

15. The image forming apparatus according to claim 1, wherein receiving includes receiving, from the information processing apparatus, image data that is to be processed based on the received print setting values.

16. The image forming apparatus according to claim 1, wherein the information to be used for displaying the object is a Uniform Resource Locator (URL) for obtaining character strings corresponding to print setting values of the first print setting item.

17. The image forming apparatus according to claim 1, wherein the object is displayed based on the transmitted first capability information and the transmitted information.

18. The image forming apparatus according to claim 1,
wherein receiving includes receiving a first user instruction for setting whether the print setting value of the second print setting item is able to be changed, and
wherein the second capability information is transmitted to the information processing apparatus based on a setting that the print setting value of the second print setting item is able to be changed.

19. The image forming apparatus according to claim 1, wherein transmitting includes transmitting the registered identifier, where the registered identifier is to be displayed by the information processing apparatus.

20. The image forming apparatus according to claim 19, wherein the transmitted identifier is to be used for setting print setting values corresponding to the combination of print setting values.

* * * * *